(12) United States Patent
Kang et al.

(10) Patent No.: US 11,477,810 B2
(45) Date of Patent: Oct. 18, 2022

(54) METHOD AND DEVICE FOR TRANSMITTING AND RECEIVING PHYSICAL UPLINK SHARED CHANNEL IN WIRELESS COMMUNICATION SYSTEM

(71) Applicant: LG ELECTRONICS INC., Seoul (KR)

(72) Inventors: Jiwon Kang, Seoul (KR); Jonghyun Park, Seoul (KR); Seongwon Go, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 17/310,527

(22) PCT Filed: Feb. 10, 2020

(86) PCT No.: PCT/KR2020/001816
§ 371 (c)(1),
(2) Date: Aug. 6, 2021

(87) PCT Pub. No.: WO2020/162728
PCT Pub. Date: Aug. 13, 2020

(65) Prior Publication Data
US 2022/0095330 A1   Mar. 24, 2022

(30) Foreign Application Priority Data
Feb. 8, 2019   (KR) .................. 10-2019-0015201

(51) Int. Cl.
*H04L 1/18*   (2006.01)
*H04L 5/00*   (2006.01)
(Continued)

(52) U.S. Cl.
CPC ....... *H04W 72/1268* (2013.01); *H04L 1/1812* (2013.01); *H04L 5/001* (2013.01);
(Continued)

(58) Field of Classification Search
CPC .......... H04W 72/1268; H04W 72/044; H04W 72/1289; H04L 1/1812; H04L 5/0051; H04L 5/001; H04L 5/0053
See application file for complete search history.

(56) References Cited

U.S. PATENT DOCUMENTS 10,925,044 B1 *   2/2021  Zhou ................. H04W 72/0413
2021/0259005 A1 *   8/2021  Yoshioka .............. H04L 1/0068
(Continued)

FOREIGN PATENT DOCUMENTS

| CN | 109644023 | * | 7/2017 | .......... H04W 72/042 |
| CN | 111264036 | * | 10/2018 | .......... H04L 5/0048 |
| KR | 1020180018504 | | 2/2018 | |

OTHER PUBLICATIONS

3rd generation Partnership Project Technical Specification Group Radio Access Network (NR) physical layer procedure for data (3GPP TS 38.214, publication date Dec. 2018) (Year: 2018).*
(Continued)

*Primary Examiner* — Diane L Lo
*Assistant Examiner* — Abusayeed M Haque
(74) *Attorney, Agent, or Firm* — Lee, Hong, Degerman, Kang & Waimey PC

(57) ABSTRACT

A method for transmitting a physical uplink shred channel (PUSCH) by a terminal in a wireless communication system according to an embodiment of the present specification comprises the steps of: receiving downlink control information (DCI) scheduling a physical uplink shared channel (PUSCH); and transmitting the physical uplink shared channel (PUSCH) on the basis of the DCI. The format of the DCI is DCI format 0_0. On the basis that spatial relation RS information for transmission of the physical uplink shared channel (PUSCH) is not configured, the physical uplink shared channel (PUSCH) is transmitted on the basis of
(Continued)

spatial relation quasi-colocation (QCL) RS information of a predefined control resource set (CORESET).

17 Claims, 13 Drawing Sheets

(51) Int. Cl.
*H04W 72/12* (2009.01)
*H04B 17/373* (2015.01)
*H04W 72/04* (2009.01)

(52) U.S. Cl.
CPC .......... *H04L 5/0051* (2013.01); *H04L 5/0053* (2013.01); *H04W 72/044* (2013.01); *H04W 72/1289* (2013.01)

(56) References Cited

U.S. PATENT DOCUMENTS

2021/0314851 A1* 10/2021 Ratasuk ................ H04L 5/0048
2021/0409094 A1* 12/2021 Yuan ..................... H04W 24/08

OTHER PUBLICATIONS

3GPP TSG RAN WG1 Meeting #AH-1901, R1-1900692, (publication date, Jan. 21-25, 2019) (Year: 2019).*
PCT International Application No. PCT/KR2020/001816, International Search Report dated May 28, 2020, 3 pages.
3rd Generation Partnership Project, "Technical Specification Group Radio Access Network; NR; Physical layer procedures for data (Release 15)," 3GPP TS 38.214 V15.4.0, Dec. 2018, 104 pages.
Nokia et al., "Enhancements on Multi-beam Operation," R1-1900692, 3GPP TSG RAN WG1 Meeting #AH-1901, Jan. 2019, 18 pages.
3rd Generation Partnership Project, "Technical Specification Group Radio Access Network; NR; Multiplexing and channel coding (Release 15)," 3GPP TS 38.212 V15.4 0, Dec. 2018, 102 pages.
Ericsson, "Enhancements to multi-beam operation," R1-1901164, 3GPP TSG RAN WG1 Ad-Hoc Meeting 1901, Jan. 2019, 17 pages.

* cited by examiner

[FIG. 1]
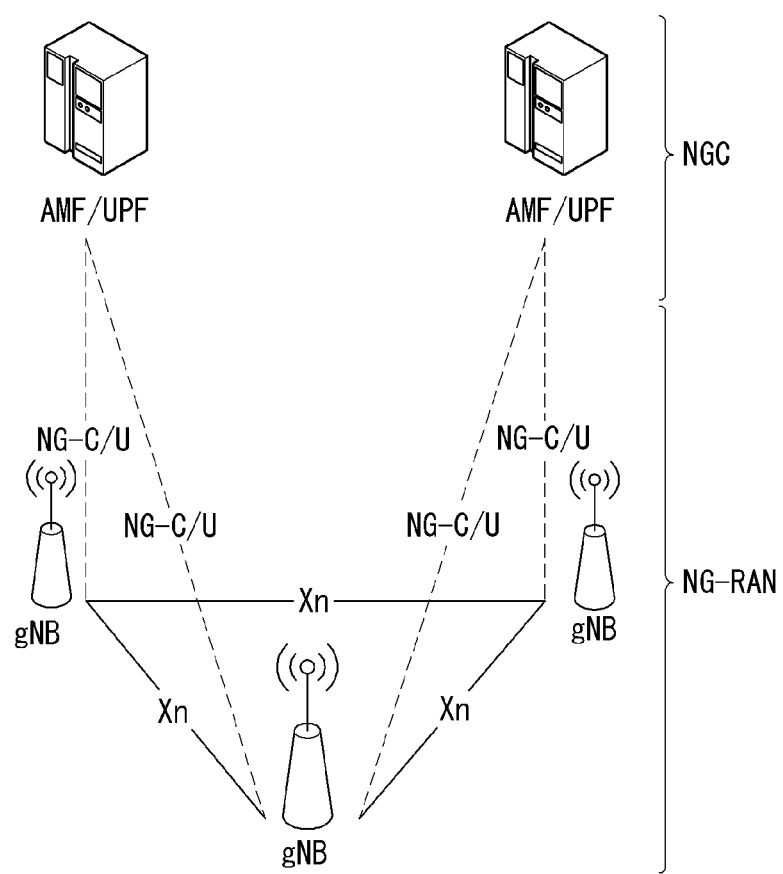

[FIG. 2]
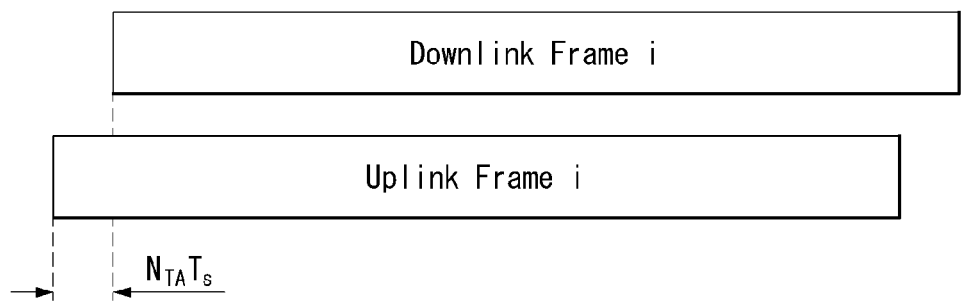

[FIG. 3]
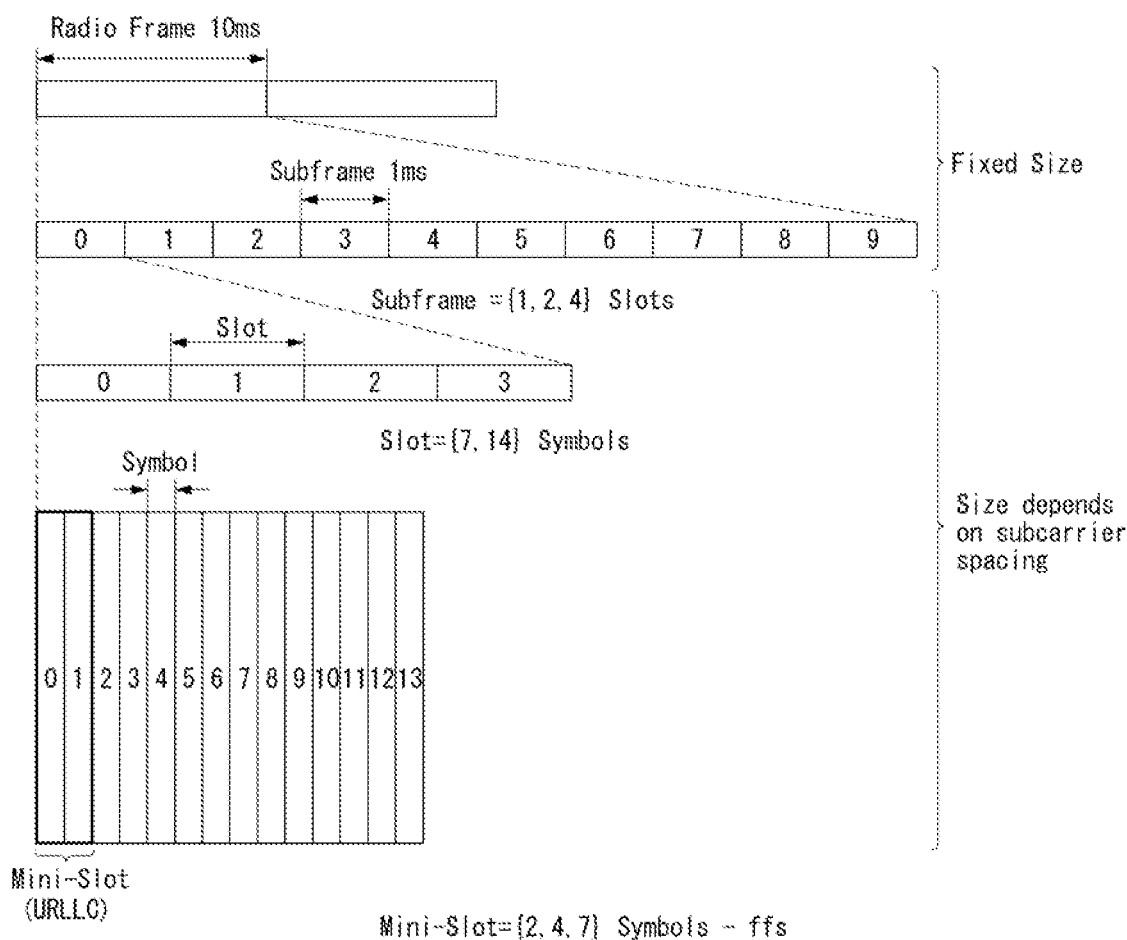

[FIG. 4]
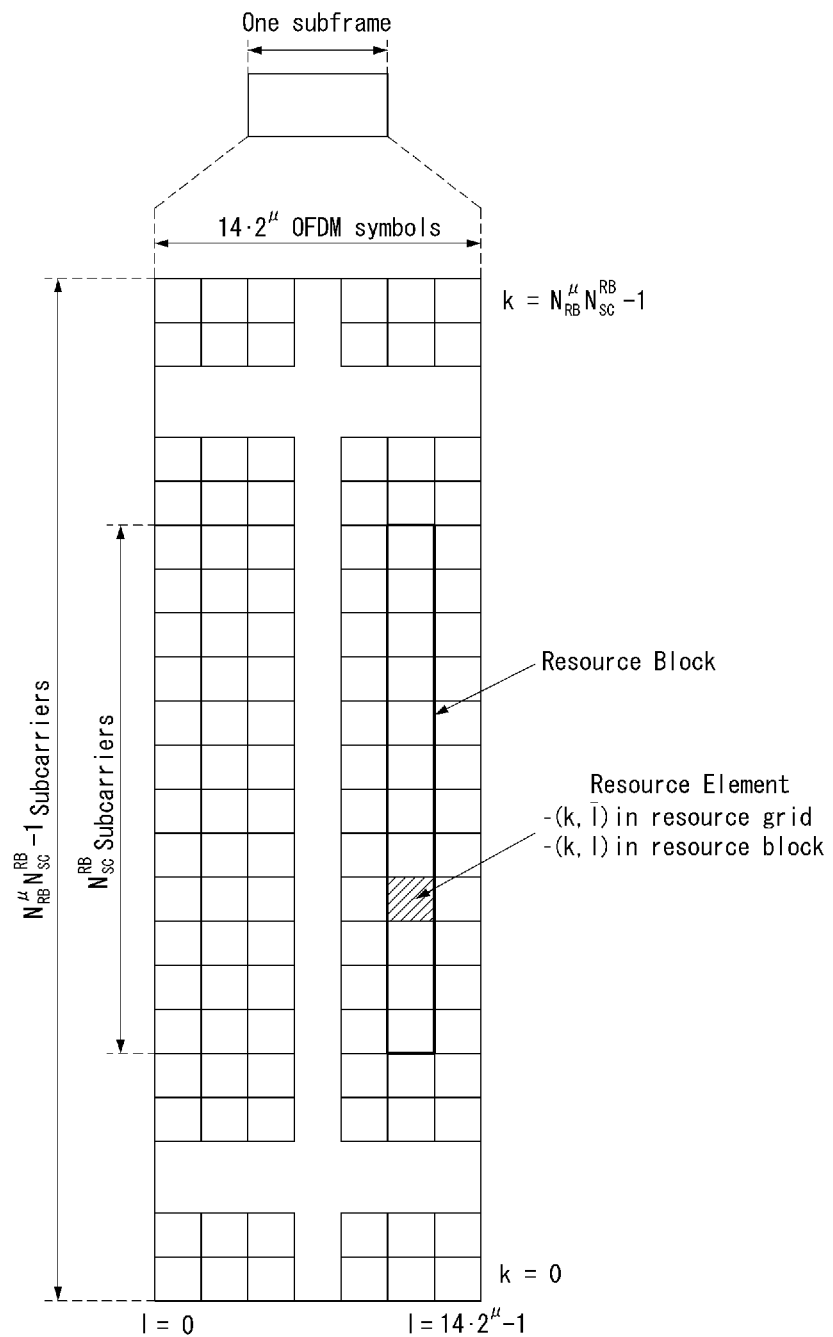

[FIG. 5]
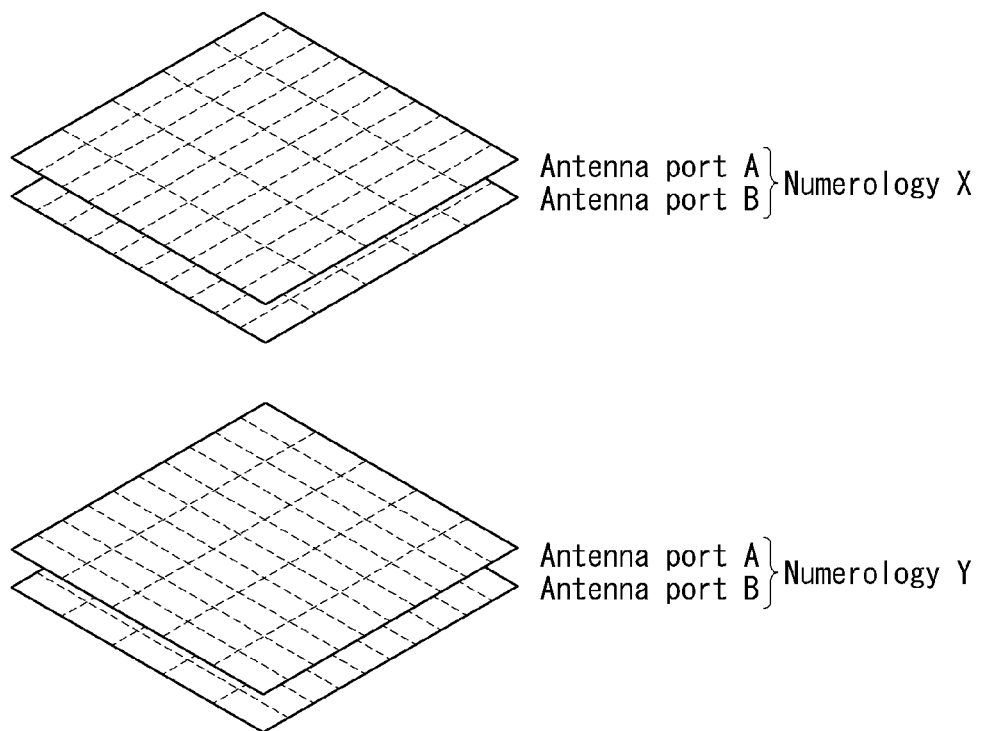

[FIG. 6]
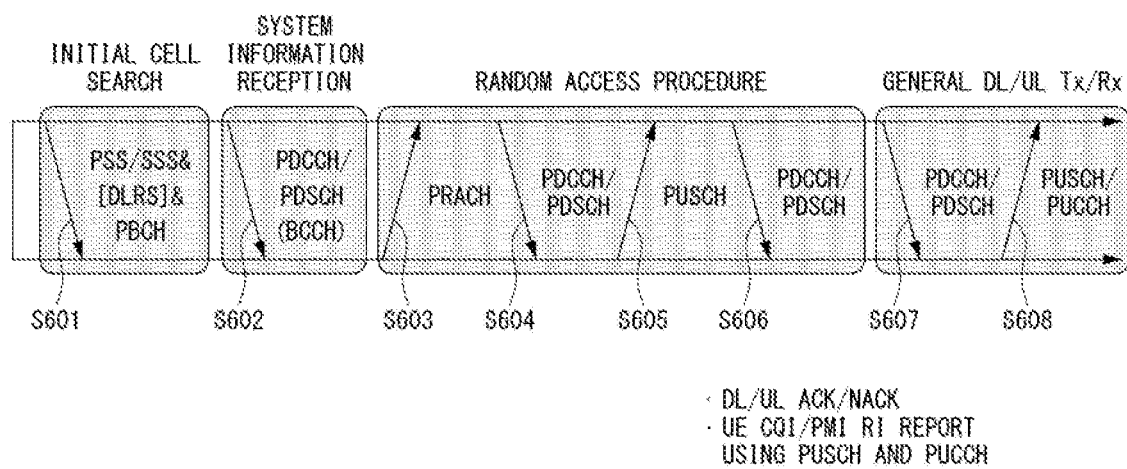

【FIG. 7】
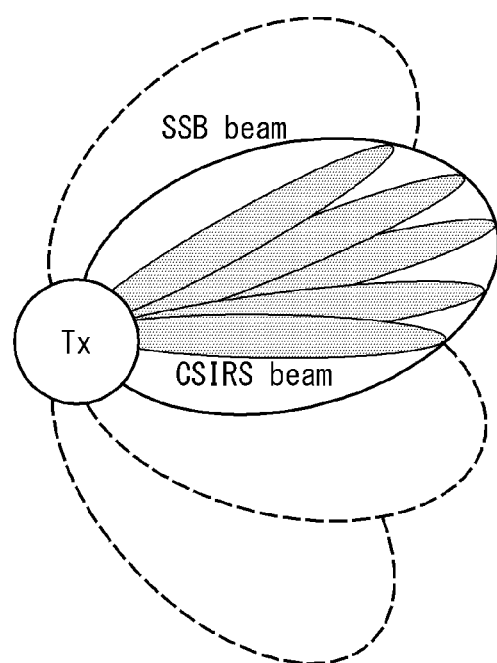

【FIG. 8】
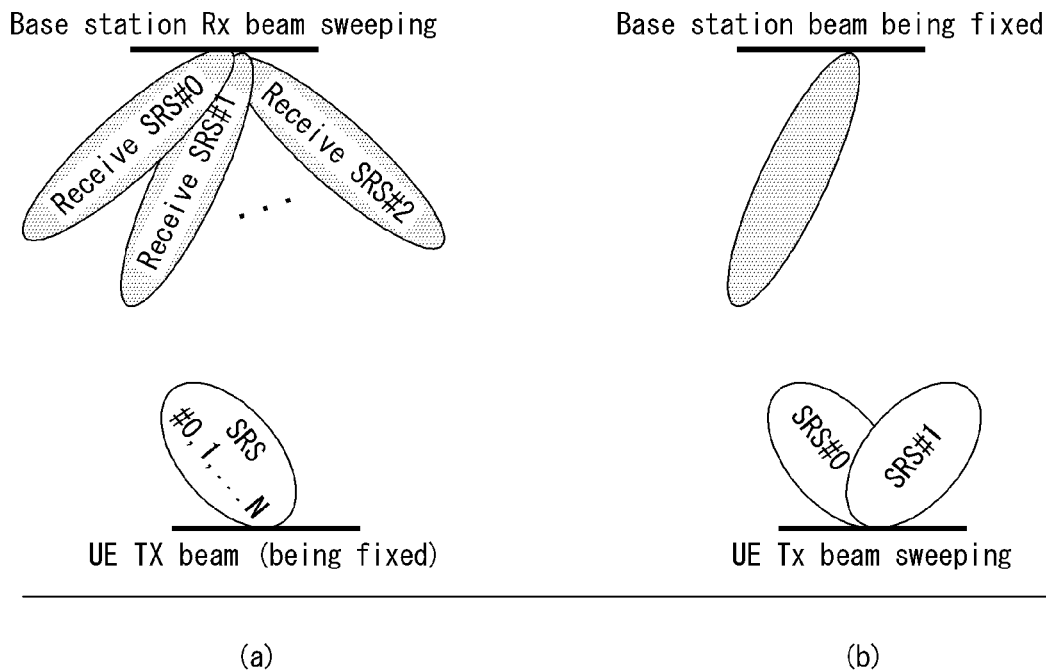
(a)                  (b)
【FIG. 9】
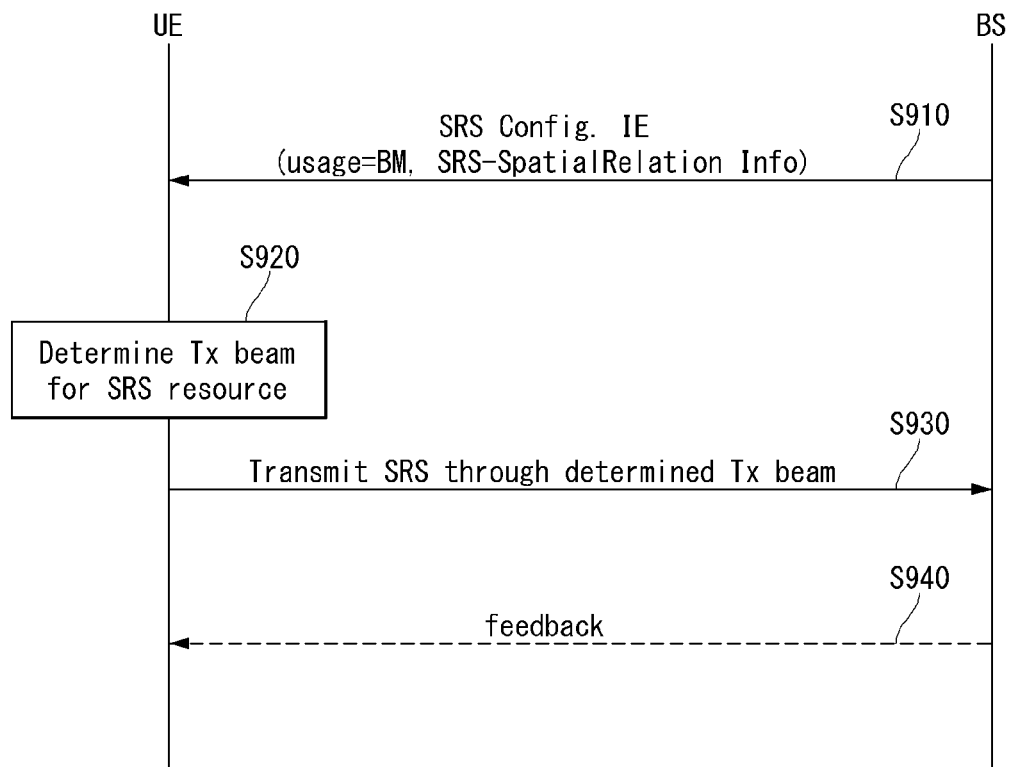

[FIG. 10]
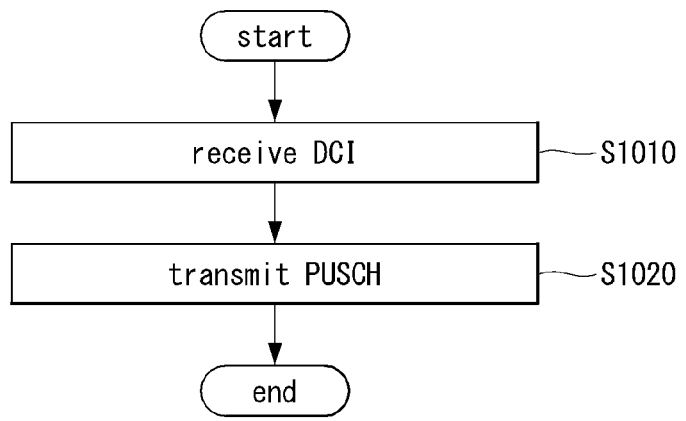
[FIG. 11]
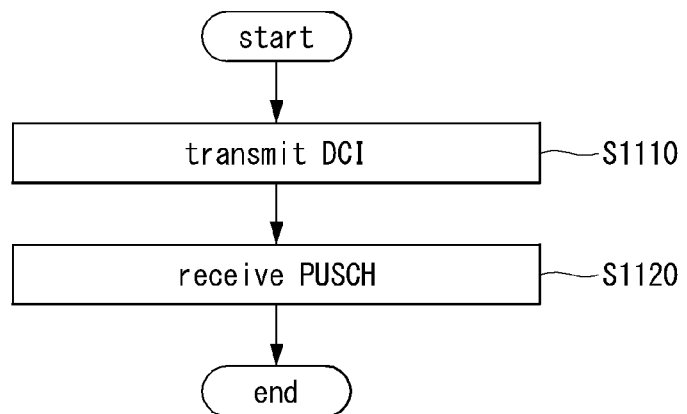

[FIG. 12]
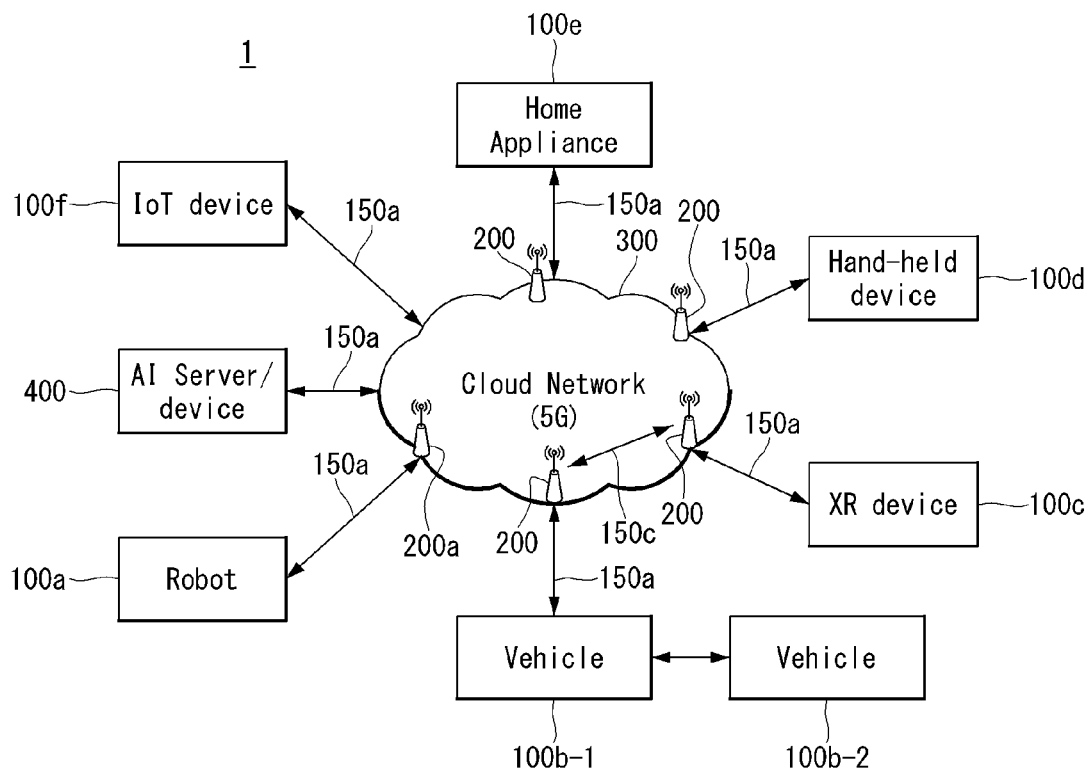
[FIG. 13]
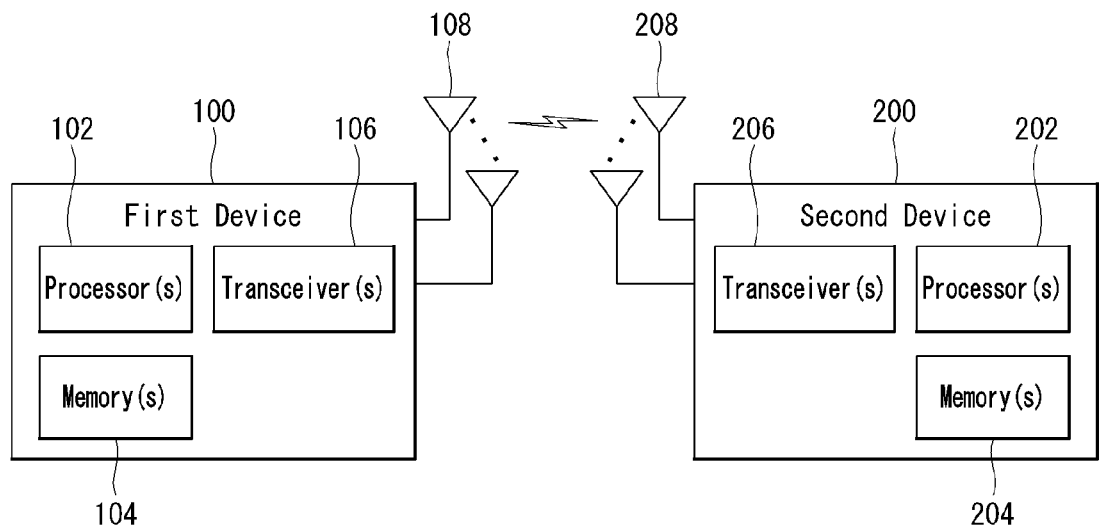

[FIG. 14]
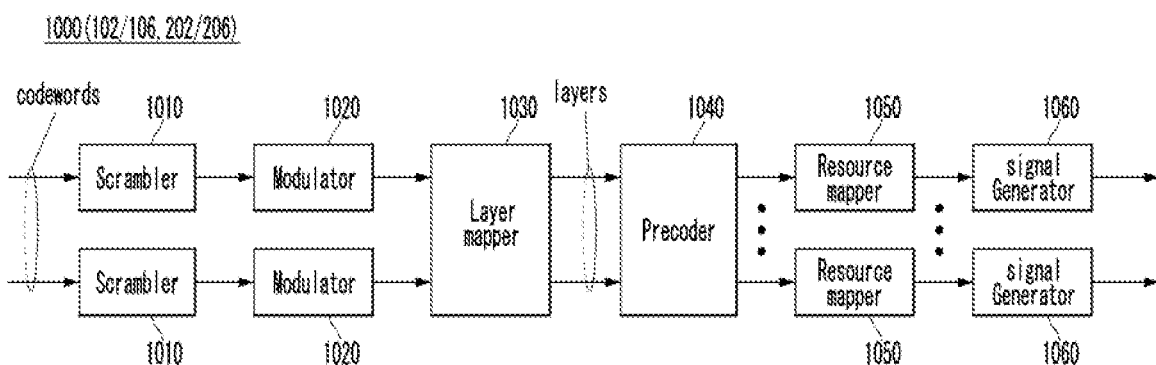

[FIG. 15]
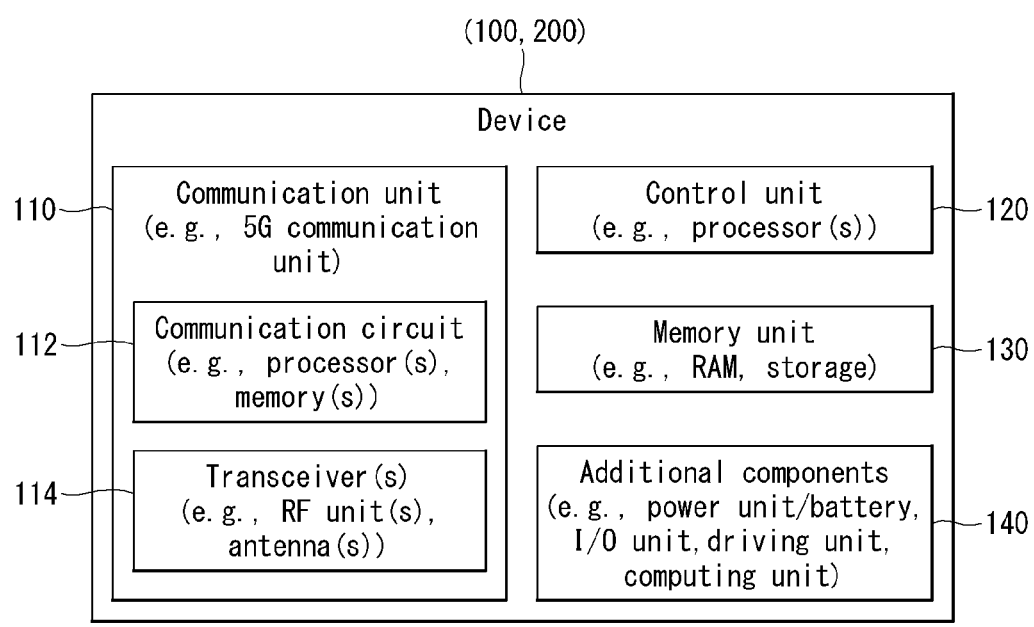

[FIG. 16]
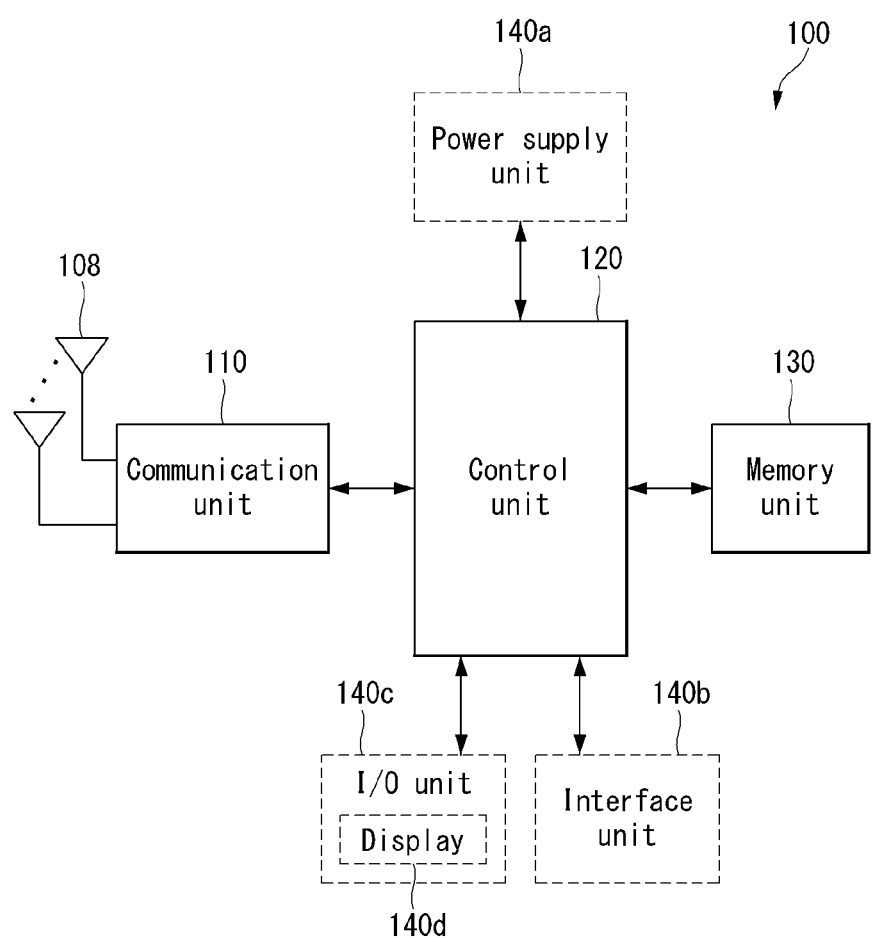

METHOD AND DEVICE FOR TRANSMITTING AND RECEIVING PHYSICAL UPLINK SHARED CHANNEL IN WIRELESS COMMUNICATION SYSTEM

CROSS-REFERENCE TO RELATED APPLICATIONS

This application is the National Stage filing under 35 U.S.C. 371 of International Application No. PCT/KR2020/001816, filed on Feb. 10, 2020, which claims the benefit of earlier filing date and right of priority to Korean Application No. 10-2019-0015201, filed on Feb. 8, 2019, the contents of which is hereby incorporated by reference herein in its entirety.

TECHNICAL FIELD

The present disclosure relates to a method and device for transmitting and receiving a physical uplink shared channel in a wireless communication system.

BACKGROUND ART

Mobile communication systems have been developed to guarantee user activity while providing voice services. Mobile communication systems are expanding their services from voice only to data. Current soaring data traffic is depleting resources and users' demand for higher-data rate services is leading to the need for more advanced mobile communication systems.

Next-generation mobile communication systems are required to meet, e.g., handling of explosively increasing data traffic, significant increase in per-user transmission rate, working with a great number of connecting devices, and support for very low end-to-end latency and high-energy efficiency. To that end, various research efforts are underway for various technologies, such as dual connectivity, massive multiple input multiple output (MIMO), in-band full duplex, non-orthogonal multiple access (NOMA), super wideband support, and device networking.

DISCLOSURE

Technical Problem

The present disclosure proposes a method of transmitting a physical uplink shared channel (PUSCH) to reduce signaling overhead.

Specifically, the present disclosure proposes a method for reducing signaling overhead in transmission of a PUSCH scheduled by DCI format 0_0.

The technical problems to be solved by the present disclosure are not limited by the above-mentioned technical problems, and other technical problems which are not mentioned above may be clearly understood from the following description by those skilled in the art to which the present disclosure pertains.

Technical Solution

In one aspect, a method of transmitting a physical uplink shared channel (PUSCH) by a user equipment (UE) in a wireless communication system includes receiving downlink control information (DCI) for scheduling a PUSCH; and transmitting the PUSCH based on the DCI.

A format of the DCI may be DCI format 0_0, and, based on that spatial relation reference signal (RS) information on transmission of the PUSCH is not configured, the PUSCH may be transmitted based on spatial relation quasi-colocation (QCL) RS information of a predefined control resource set (CORESET).

The predefined CORESET may be a CORESET having a lowest ID in a latest slot in an active bandwidth part (BWP).

The method may further include receiving configuration information related to transmission of the PUSCH, wherein the configuration information includes information indicating application of the QCL RS information of the predefined CORSET.

The DCI may not include the spatial relation RS information on transmission of the PUSCH.

The DCI may not include a sounding reference signal (SRS) resource indicator (SRI) field.

Configuring of the spatial relation RS information on transmission of the PUSCH may be determined by configuration for a physical uplink control channel (PUCCH) resource of a BWP or a component carrier (CC) related to the PUSCH.

Based on that the PUSCH includes hybrid automatic repeat request (HARQ)-acknowledgement (ACK) information on a physical downlink shared channel (PDSCH), the PUSCH may be transmitted based on QCL RS information of the PDSCH.

Based on that the PUSCH includes HARQ-ACK information on a plurality of PDSCHs, the PUSCH may be transmitted based on predetermined spatial relation QCL RS information.

The predetermined spatial relation QCL RS information may include any one of i) any one of a plurality of transmission configuration indication (TCI) states for the plurality of PDSCHs, ii) a TCI state having a specific index among the plurality of TCI states for the plurality of PDSCHs, and iii) a TCI state of a CORESET related to scheduling of the plurality of PDSCHs.

In another aspect, a user equipment (UE) for transmitting a physical uplink shared channel (PUSCH) in a wireless communication system includes one or more transceivers; one or more processors; and one or more memories configured to be operatively connected to the one or more processors and to store instructions for performing operations when transmission of a physical uplink shared channel (PUSCH) is executed by the one or more processors.

The operations may include: receiving downlink control information (DCI) for scheduling a PUSCH; and transmitting the PUSCH based on the DCI.

A format of the DCI may be DCI format 0_0, and, based on that spatial relation reference signal (RS) information on transmission of the PUSCH is not configured, the PUSCH may be transmitted based on spatial relation quasi-colocation (QCL) RS information of a predefined control resource set (CORESET).

The predefined CORESET may be a CORESET having a lowest ID in a latest slot in an active bandwidth part (BWP).

The user equipment may further include: receiving configuration information related to transmission of the PUSCH, wherein the configuration information may include information indicating application of the QCL RS information of the predefined CORESET.

The DCI may not include the spatial relation RS information on transmission of the PUSCH.

The DCI may not include a sounding reference signal (SRS) resource indicator (SRI) field.

Configuring of the spatial relation RS information on transmission of the PUSCH may be determined by configuration for a physical uplink control channel (PUCCH) resource of a BWP or a component carrier (CC) related to the PUSCH.

Based on that the PUSCH includes hybrid automatic repeat request (HARQ)-acknowledgement (ACK) information on a physical downlink shared channel (PDSCH), the PUSCH may be transmitted based on QCL RS information of the PDSCH.

Based on that the PUSCH includes HARQ-ACK information on a plurality of PDSCHs, the PUSCH may be transmitted based on predetermined spatial relation QCL RS information.

The predetermined spatial relation QCL RS information may include any one of i) any one of a plurality of transmission configuration indication (TCI) states for the plurality of PDSCHs, ii) a TCI state having a specific index among the plurality of TCI states for the plurality of PDSCHs, and iii) a TCI state of a CORESET related to scheduling of the plurality of PDSCHs.

In another aspect, a device includes one or more memories and one or more processors functionally connected to the one or more memories.

The one or more processors may be configured such that the device receives downlink control information (DCI) for scheduling a PUSCH and transmits the PUSCH based on the DCI.

A format of the DCI may be DCI format 0_0, and, based on that spatial relation reference signal (RS) information on transmission of the PUSCH is not configured, the PUSCH may be transmitted based on spatial relation quasi-colocation (QCL) RS information of a predefined control resource set (CORESET).

In another aspect a non-transitory computer-readable medium, which is one or more, stores one or more instructions.

One or more instructions executable by one or more processors may be configured such that a user equipment receives downlink control information (DCI) for scheduling a PUSCH and transmits the PUSCH based on the DCI.

A format of the DCI may be DCI format 0_0, and, based on that spatial relation reference signal (RS) information on transmission of the PUSCH is not configured, the PUSCH may be transmitted based on spatial relation quasi-colocation (QCL) RS information of a predefined control resource set (CORESET).

Advantageous Effects

According to an embodiment of the present disclosure, a physical uplink shared channel (PUSCH) is scheduled by downlink control information (DCI). The format of the DCI is DCI format 0_0, and based on that spatial relation RS information on transmission of the PUSCH is not configured, the PUSCH is transmitted based on spatial relation QCL (quasi-colocation) RS information of a predefined control resource set (CORESET).

Therefore, when there is no configuration of a beam for transmission of a PUSCH scheduled based on DCI format 0_0, 1) ambiguity of the PUSCH transmission and reception operation may be eliminated and 2) a signaling procedure for updating spatial relation information of the PUCCH resource having a lowest PUCCH ID may be omitted, and thus, signaling overhead is reduced.

According to an embodiment of the present disclosure, based on that the PUSCH includes HARQ-ACK information on a physical downlink shared channel (PDSCH), the PUSCH is transmitted based on QCL RS information of the PDSCH. Accordingly, since an uplink transmission beam/panel may be changed according to a change of the downlink reception beam, a procedure or signaling for a separate uplink beam/panel change due to movement of a UE may be omitted.

According to an embodiment of the present disclosure, based on that the PUSCH includes HARQ-ACK information on a plurality of PDSCHs, the PUSCH is transmitted based on predetermined spatial relation QCL RS information. The predetermined spatial relation QCL RS information may include any one of i) any one of a plurality of transmission configuration indication (TCI) states for the plurality of PDSCHs, ii) a TCI state having a specific index among the plurality of TCI states for the plurality of PDSCHs, and iii) a TCI state of a CORESET related to scheduling of the plurality of PDSCHs. Therefore, a problem of ambiguity in operation of the UE/BS that occurs when ACK/NACK for a plurality of PDSCHs is transmitted in one PUSCH resource may be prevented.

As described above, according to the embodiments of the present disclosure, i) when there is no beam configuration for PUSCH transmission scheduled by DCI format 0_0, ii) when the PUSCH includes ACK/NACK of the PDSCH, and iii) when the PUSCH includes ACK/NACK of a plurality of PDSCHs, ambiguity of the operation of the UE/BS does not occur in any of i) to iii) above and the PUSCH may be transmitted without an additional signaling procedure. Accordingly, flexibility related to beam configuration increases in PUSCH transmission.

Effects which may be obtained by the present disclosure are not limited to the aforementioned effects, and other technical effects not described above may be evidently understood by a person having ordinary skill in the art to which the present disclosure pertains from the following description.

DESCRIPTION OF DRAWINGS

The accompanying drawings, which are included to provide a further understanding of the present disclosure and constitute a part of the detailed description, illustrate embodiments of the present disclosure and together with the description serve to explain the principle of the present disclosure.

FIG. 1 is a diagram illustrating an example of an overall system structure of NR to which a method proposed in the present disclosure is applicable.

FIG. 2 illustrates a relationship between an uplink frame and a downlink frame in a wireless communication system to which a method proposed by the present disclosure is applicable.

FIG. 3 illustrates an example of a frame structure in an NR system.

FIG. 4 illustrates an example of a resource grid supported by a wireless communication system to which a method proposed in the present disclosure is applicable.

FIG. 5 illustrates examples of a resource grid for each antenna port and numerology to which a method proposed in the present disclosure is applicable.

FIG. 6 illustrates physical channels and general signal transmission used in a 3GPP system.

FIG. 7 illustrates an example of beamforming using SSB and CSI-RS.

FIG. 8 illustrates an example of a UL BM procedure using an SRS.

FIG. 9 is a flowchart showing an example of a UL BM procedure using the SRS.

FIG. 10 is a flowchart illustrating a method for transmitting a physical uplink shared channel by a UE in a wireless communication system according to an embodiment of the present disclosure.

FIG. 11 is a flowchart illustrating a method for receiving a physical uplink shared channel by a BS in a wireless communication system according to another embodiment of the present disclosure.

FIG. 12 illustrates a communication system 1 applied to the present disclosure.

FIG. 13 illustrates a wireless device applicable to the present disclosure.

FIG. 14 illustrates a signal processing circuit applied to the present disclosure.

FIG. 15 shows another example of a wireless device applied to the present disclosure.

FIG. 16 exemplifies a portable device applied to the present disclosure.

MODE FOR DISCLOSURE

Hereinafter, preferred embodiments of the disclosure are described in detail with reference to the accompanying drawings. The following detailed description taken in conjunction with the accompanying drawings is intended for describing example embodiments of the disclosure, but not for representing a sole embodiment of the disclosure. The detailed description below includes specific details to convey a thorough understanding of the disclosure. However, it will be easily appreciated by one of ordinary skill in the art that embodiments of the disclosure may be practiced even without such details.

In some cases, to avoid ambiguity in concept, known structures or devices may be omitted or be shown in block diagrams while focusing on core features of each structure and device.

Hereinafter, downlink (DL) means communication from a base station to a terminal and uplink (UL) means communication from the terminal to the base station. In the downlink, a transmitter may be part of the base station, and a receiver may be part of the terminal. In the uplink, the transmitter may be part of the terminal and the receiver may be part of the base station. The base station may be expressed as a first communication device and the terminal may be expressed as a second communication device. A base station (BS) may be replaced with terms including a fixed station, a Node B, an evolved-NodeB (eNB), a Next Generation NodeB (gNB), a base transceiver system (BTS), an access point (AP), a network (5G network), an AI system, a road side unit (RSU), a vehicle, a robot, an Unmanned Aerial Vehicle (UAV), an Augmented Reality (AR) device, a Virtual Reality (VR) device, and the like. Further, the terminal may be fixed or mobile and may be replaced with terms including a User Equipment (UE), a Mobile Station (MS), a user terminal (UT), a Mobile Subscriber Station (MSS), a Subscriber Station (SS), an Advanced Mobile Station (AMS), a Wireless Terminal (WT), a Machine-Type Communication (MTC) device, a Machine-to-Machine (M2M) device, and a Device-to-Device (D2D) device, the vehicle, the robot, an AI module, the Unmanned Aerial Vehicle (UAV), the Augmented Reality (AR) device, the Virtual Reality (VR) device, and the like.

The following technology may be used in various wireless access systems, such as code division multiple access (CDMA), frequency division multiple access (FDMA), time division multiple access (TDMA), orthogonal frequency division multiple access (OFDMA), single carrier-FDMA (SC-FDMA), non-orthogonal multiple access (NOMA), and the like. The CDMA may be implemented by radio technology such as universal terrestrial radio access (UTRA) or CDMA2000. The TDMA may be implemented by radio technology such as global system for mobile communications (GSM)/general packet radio service (GPRS)/enhanced data rates for GSM evolution (EDGE). The OFDMA may be implemented as radio technology such as IEEE 802.11(Wi-Fi), IEEE 802.16 (WiMAX), IEEE 802-20, E-UTRA (evolved UTRA), and the like. The UTRA is a part of a universal mobile telecommunication system (UMTS). 3rd generation partnership project (3GPP) long term evolution (LTE), as a part of an evolved UMTS (E-UMTS) using E-UTRA, adopts the OFDMA in the downlink and the SC-FDMA in the uplink. LTE-A (advanced) is the evolution of 3GPP LTE.

For clarity of description, the present disclosure is described based on the 3GPP communication system (e.g., LTE-A or NR), but the technical spirit of the present disclosure are not limited thereto. LTE means technology after 3GPP TS 36.xxx Release 8. In detail, LTE technology after 3GPP TS 36.xxx Release 10 is referred to as the LTE-A and LTE technology after 3GPP TS 36.xxx Release 13 is referred to as the LTE-A pro. The 3GPP NR means technology after TS 38.xxx Release 15. The LTE/NR may be referred to as a 3GPP system. "xxx" means a standard document detail number. The LTE/NR may be collectively referred to as the 3GPP system. Matters disclosed in a standard document published before the present disclosure may refer to a background art, terms, abbreviations, etc., used for describing the present disclosure. For example, the following documents may be referenced.

3GPP LTE
36.211: Physical channels and modulation
36.212: Multiplexing and channel coding
36.213: Physical layer procedures
36.300: Overall description
36.331: Radio Resource Control (RRC)
3GPP NR
38.211: Physical channels and modulation
38.212: Multiplexing and channel coding
38.213: Physical layer procedures for control
38.214: Physical layer procedures for data
38.300: NR and NG-RAN Overall Description
36.331: Radio Resource Control (RRC) protocol specification As more and more communication devices require larger communication capacity, there is a need for improved mobile broadband communication compared to the existing radio access technology (RAT). Further, massive machine type communications (MTCs), which provide various services anytime and anywhere by connecting many devices and objects, are one of the major issues to be considered in the next generation communication. In addition, a communication system design considering a service/UE sensitive to reliability and latency is being discussed. As such, the introduction of next-generation radio access technology considering enhanced mobile broadband communication (eMBB), massive MTC (mMTC), ultra-reliable and low latency communication (URLLC) is discussed, and in the present disclosure, the technology is called NR for convenience. The NR is an expression representing an example of 5G radio access technology (RAT).

Three major requirement areas of 5G include (1) an enhanced mobile broadband (eMBB) area, (2) a massive machine type communication (mMTC) area and (3) an ultra-reliable and low latency communications (URLLC) area.

Some use cases may require multiple areas for optimization, and other use case may be focused on only one key performance indicator (KPI). 5G support such various use cases in a flexible and reliable manner.

eMBB is far above basic mobile Internet access and covers media and entertainment applications in abundant bidirectional tasks, cloud or augmented reality. Data is one of key motive powers of 5G, and dedicated voice services may not be first seen in the 5G era. In 5G, it is expected that voice will be processed as an application program using a data connection simply provided by a communication system. Major causes for an increased traffic volume include an increase in the content size and an increase in the number of applications that require a high data transfer rate. Streaming service (audio and video), dialogue type video and mobile Internet connections will be used more widely as more devices are connected to the Internet. Such many application programs require connectivity always turned on in order to push real-time information and notification to a user. A cloud storage and application suddenly increases in the mobile communication platform, and this may be applied to both business and entertainment. Furthermore, cloud storage is a special use case that tows the growth of an uplink data transfer rate. 5G is also used for remote business of cloud. When a tactile interface is used, further lower end-to-end latency is required to maintain excellent user experiences. Entertainment, for example, cloud game and video streaming are other key elements which increase a need for the mobile broadband ability. Entertainment is essential in the smartphone and tablet anywhere including high mobility environments, such as a train, a vehicle and an airplane. Another use case is augmented reality and information search for entertainment. In this case, augmented reality requires very low latency and an instant amount of data.

Furthermore, one of the most expected 5G use case relates to a function capable of smoothly connecting embedded sensors in all fields, that is, mMTC. Until 2020, it is expected that potential IoT devices will reach 20.4 billions. The industry IoT is one of areas in which 5G performs major roles enabling smart city, asset tracking, smart utility, agriculture and security infra.

URLLC includes a new service which will change the industry through remote control of major infra and a link having ultra reliability/low available latency, such as a self-driving vehicle. A level of reliability and latency is essential for smart grid control, industry automation, robot engineering, drone control and adjustment.

Multiple use cases are described more specifically.

5G may supplement fiber-to-the-home (FTTH) and cable-based broadband (or DOCSIS) as means for providing a stream evaluated from gigabits per second to several hundreds of mega bits per second. Such fast speed is necessary to deliver TV with resolution of 4K or more (6K, 8K or more) in addition to virtual reality and augmented reality. Virtual reality (VR) and augmented reality (AR) applications include immersive sports games. A specific application program may require a special network configuration. For example, in the case of VR game, in order for game companies to minimize latency, a core server may need to be integrated with the edge network server of a network operator.

An automotive is expected to be an important and new motive power in 5G, along with many use cases for the mobile communication of an automotive. For example, entertainment for a passenger requires a high capacity and a high mobility mobile broadband at the same time. The reason for this is that future users continue to expect a high-quality connection regardless of their location and speed. Another use example of the automotive field is an augmented reality dashboard. The augmented reality dashboard overlaps and displays information, identifying an object in the dark and notifying a driver of the distance and movement of the object, over a thing seen by the driver through a front window. In the future, a wireless module enables communication between automotives, information exchange between an automotive and a supported infrastructure, and information exchange between an automotive and other connected devices (e.g., devices accompanied by a pedestrian). A safety system guides alternative courses of a behavior so that a driver may drive more safely, thereby reducing a danger of an accident. A next step will be a remotely controlled or self-driven vehicle. This requires very reliable, very fast communication between different self-driven vehicles and between an automotive and infra. In the future, a self-driven vehicle may perform all driving activities, and a driver will be focused on things other than traffic, which cannot be identified by an automotive itself. Technical requirements of a self-driven vehicle require ultra-low latency and ultra-high speed reliability so that traffic safety is increased up to a level which cannot be achieved by a person.

A smart city and smart home mentioned as a smart society will be embedded as a high-density radio sensor network. The distributed network of intelligent sensors will identify the cost of a city or home and a condition for energy-efficient maintenance. A similar configuration may be performed for each home. All of a temperature sensor, a window and heating controller, a burglar alarm and home appliances are wirelessly connected. Many of such sensors are typically a low data transfer rate, low energy and a low cost. However, for example, real-time HD video may be required for a specific type of device for surveillance.

The consumption and distribution of energy including heat or gas are highly distributed and thus require automated control of a distributed sensor network. A smart grid collects information, and interconnects such sensors using digital information and a communication technology so that the sensors operate based on the information. The information may include the behaviors of a supplier and consumer, and thus the smart grid may improve the distribution of fuel, such as electricity, in an efficient, reliable, economical, production-sustainable and automated manner. The smart grid may be considered to be another sensor network having small latency.

A health part owns many application programs which reap the benefits of mobile communication. A communication system may support remote treatment providing clinical treatment at a distant place. This helps to reduce a barrier for the distance and may improve access to medical services which are not continuously used at remote farming areas. Furthermore, this is used to save life in important treatment and an emergency condition. A radio sensor network based on mobile communication may provide remote monitoring and sensors for parameters, such as the heart rate and blood pressure.

Radio and mobile communication becomes increasingly important in the industry application field. Wiring requires a high installation and maintenance cost. Accordingly, the possibility that a cable will be replaced with reconfigurable radio links is an attractive opportunity in many industrial fields. However, to achieve the possibility requires that a radio connection operates with latency, reliability and capacity similar to those of the cable and that management is simplified. Low latency and a low error probability is a new requirement for a connection to 5G.

Logistics and freight tracking is an important use case for mobile communication, which enables the tracking inventory and packages anywhere using a location-based information system. The logistics and freight tracking use case typically requires a low data speed, but a wide area and reliable location information.

In a New RAT system including NR uses an OFDM transmission scheme or a similar transmission scheme thereto. The new RAT system may follow OFDM parameters different from OFDM parameters of LTE. Alternatively, the new RAT system may follow numerology of conventional LTE/LTE-A as it is or have a larger system bandwidth (e.g., 100 MHz). Alternatively, one cell may support a plurality of numerologies. In other words, UEs that operate with different numerologies may coexist in one cell.

The numerology corresponds to one subcarrier spacing in a frequency domain. By scaling a reference subcarrier spacing by an integer N, different numerologies may be defined.

Definition of Terms eLTE eNB: The eLTE eNB is the evolution of eNB that supports connectivity to EPC and NGC.

gNB: Anode which supports the NR as well as connectivity to NGC.

New RAN: A radio access network which supports either NR or E-UTRA or interfaces with the NGC.

Network slice: A network slice is a network defined by the operator customized to provide an optimized solution for a specific market scenario which demands specific requirements with end-to-end scope.

Network function: A network function is a logical node within a network infrastructure that has well-defined external interfaces and well-defined functional behavior.

NG-C: A control plane interface used at an NG2 reference point between new RAN and NGC.

NG-U: A user plane interface used at an NG3 reference point between new RAN and NGC.

Non-standalone NR: A deployment configuration where the gNB requires an LTE eNB as an anchor for control plane connectivity to EPC, or requires an eLTE eNB as an anchor for control plane connectivity to NGC.

Non-standalone E-UTRA: A deployment configuration where the eLTE eNB requires a gNB as an anchor for control plane connectivity to NGC.

User plane gateway: An end point of NG-U interface.

Overview of System

FIG. 1 illustrates an example overall NR system structure to which a method as proposed in the disclosure may apply.

Referring to FIG. 1, an NG-RAN is constituted of gNBs to provide a control plane (RRC) protocol end for user equipment (UE) and NG-RA user plane (new AS sublayer/PDCP/RLC/MAC/PHY).

The gNBs are mutually connected via an Xn interface.

The gNBs are connected to the NGC via the NG interface.

More specifically, the gNB connects to the access and mobility management function (AMF) via the N2 interface and connects to the user plane function (UPF) via the N3 interface.

New RAT (NR) Numerology and Frame Structure

In the NR system, a number of numerologies may be supported. Here, the numerology may be defined by the subcarrier spacing and cyclic prefix (CP) overhead. At this time, multiple subcarrier spacings may be derived by scaling the basic subcarrier spacing by integer N (or, μ). Further, although it is assumed that a very low subcarrier spacing is not used at a very high carrier frequency, the numerology used may be selected independently from the frequency band.

Further, in the NR system, various frame structures according to multiple numerologies may be supported.

Hereinafter, an orthogonal frequency division multiplexing (OFDM) numerology and frame structure that may be considered in the NR system is described.

The multiple OFDM numerologies supported in the NR system may be defined as shown in Table 1.

TABLE 1

| μ | Δf = $2^μ$ · 15 [kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

NR supports multiple numerologies (or subcarrier spacings (SCS)) for supporting various 5G services. For example, if SCS is 15 kHz, NR supports a wide area in typical cellular bands. If SCS is 30 kHz/60 kHz, NR supports a dense urban, lower latency and a wider carrier bandwidth. If SCS is 60 kHz or higher, NR supports a bandwidth greater than 24.25 GHz in order to overcome phase noise.

An NR frequency band is defined as a frequency range of two types FR1 and FR2. The FR1 and the FR2 may be configured as in Table 1 below. Furthermore, the FR2 may mean a millimeter wave (mmW).

TABLE 2

| Frequency Range designation | Corresponding frequency range | Subcarrier Spacing |
|---|---|---|
| FR1 | 410 MHz-7125 MHz | 15, 30, 60 kHz |
| FR2 | 24250 MHz-52600 MHz | 60, 120, 240 kHz |

With regard to the frame structure in the NR system, the size of various fields in the time domain is expressed as a multiple of time unit of $T_s=1/(\Delta f_{max} \cdot N_f)$, where $\Delta f_{max}=480·10^3$, and $N_f=4096$. Downlink and uplink transmissions is constituted of a radio frame with a period of $T_f=(\Delta f_{max} N_f/100) \cdot T_s=10$ ms. Here, the radio frame is constituted of 10 subframes each of which has a period of $T_{sf}=(\Delta f_{max} N_f/1000) \cdot T_s=1$ ms In this case, one set of frames for uplink and one set of frames for downlink may exist.

FIG. 2 illustrates a relationship between an uplink frame and downlink frame in a wireless communication system to which a method described in the present disclosure is applicable.

As illustrated in FIG. 2, uplink frame number i for transmission from the user equipment (UE) should begin $T_{TA}=N_{TA}T_s$ earlier than the start of the downlink frame by the UE.

For numerology μ, slots are numbered in ascending order of $n_s^\mu \in \{0, \ldots, N_{subframe}^{slots,\mu}-1\}$ in the subframe and in ascending order of $n_{s,f}^\mu \in \{0, \ldots, N_{frame}^{slots,\mu}-1\}$ in the radio frame. One slot includes consecutive OFDM symbols of $N_{symb}^\mu$, and $N_{symb}^\mu$ is determined according to the used numerology and slot configuration. In the subframe, the start of slot $n_s^\mu$ is temporally aligned with the start of $n_s^\mu N_{symb}^\mu$.

Not all UEs are able to transmit and receive at the same time, and this means that not all OFDM symbols in a downlink slot or an uplink slot are available to be used.

Table 3 represents the number $N_{symb}^{slot}$ of OFDM symbols per slot, the number $N_{slot}^{frame,\mu}$ of slots per radio frame, and the number $N_{slot}^{subframe,\mu}$ of slots per subframe in a normal CP. Table 4 represents the number of OFDM symbols per slot, the number of slots per radio frame, and the number of slots per subframe in an extended CP.

TABLE 3

| μ | $N_{symb}^{slot}$ | $N_{slot}^{frame,\mu}$ | $N_{slot}^{subframe,\mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

TABLE 4

| μ | $N_{symb}^{slot}$ | $N_{slot}^{frame,\mu}$ | $N_{slot}^{subframe,\mu}$ |
|---|---|---|---|
| 2 | 12 | 40 | 4 |

FIG. 3 illustrates an example of a frame structure in a NR system. FIG. 3 is merely for convenience of explanation and does not limit the scope of the present disclosure.

In Table 4, in case of μ=2, i.e., as an example in which a subcarrier spacing (SCS) is 60 kHz, one subframe (or frame) may include four slots with reference to Table 3, and one subframe={1, 2, 4} slots shown in FIG. 3, for example, the number of slot(s) that may be included in one subframe may be defined as in Table 3.

Further, a mini-slot may consist of 2, 4, or 7 symbols, or may consist of more symbols or less symbols.

In regard to physical resources in the NR system, an antenna port, a resource grid, a resource element, a resource block, a carrier part, etc. May be considered.

Hereinafter, the above physical resources that may be considered in the NR system are described in more detail.

First, in regard to an antenna port, the antenna port is defined so that a channel over which a symbol on an antenna port is conveyed may be inferred from a channel over which another symbol on the same antenna port is conveyed. When large-scale properties of a channel over which a symbol on one antenna port is conveyed may be inferred from a channel over which a symbol on another antenna port is conveyed, the two antenna ports may be regarded as being in a quasi co-located or quasi co-location (QC/QCL) relation. Here, the large-scale properties may include at least one of delay spread, Doppler spread, frequency shift, average received power, and received timing.

FIG. 4 illustrates an example of a resource grid supported in a wireless communication system to which a method proposed in the present disclosure is applicable.

Referring to FIG. 4, a resource grid consists of $N_{RB}^\mu N_{sc}^{RB}$ subcarriers on a frequency domain, each subframe consisting of 14·2μ OFDM symbols, but the present disclosure is not limited thereto.

In the NR system, a transmitted signal is described by one or more resource grids, consisting of $N_{RB}^\mu N_{sc}^{RB}$ subcarriers, and $2^\mu N_{symb}^{(\mu)}$ OFDM symbols, where $N_{RB}^\mu \leq N_{RB}^{max,\mu}$. $N_{RB}^{max,\mu}$ denotes a maximum transmission bandwidth and may change not only between numerologies but also between uplink and downlink.

In this case, as illustrated in FIG. 5, one resource grid may be configured per numerology μ and antenna port p.

FIG. 5 illustrates examples of a resource grid per antenna port and numerology to which a method proposed in the present disclosure is applicable.

Each element of the resource grid for the numerology μ and the antenna port p is called a resource element and is uniquely identified by an index pair (k,l̄) where k=0, ..., $N_{RB}^\mu N_{sc}^{RB}-1$ is an index on a frequency domain, and l̄=0, ..., $2^\mu N_{symb}^{(\mu)}-1$ refers to a location of a symbol in a subframe. The index pair (k,l) is used to refer to a resource element in a slot, where l=0, ..., $N_{symb}^\mu-1$.

The resource element (k,l̄) for the numerology μ and the antenna port p corresponds to a complex value $a_{k,l}^{(p,\mu)}$. When there is no risk for confusion or when a specific antenna port or numerology is not specified, the indexes p and μ may be dropped, and as a result, the complex value may be $a_{k,l}^{(p)}$ or $a_{k,l}$.

Further, a physical resource block is defined as $N_{sc}^{RB}=12$ consecutive subcarriers in the frequency domain.

Point A serves as a common reference point of a resource block grid and may be obtained as follows.

offsetToPointA for PCell downlink represents a frequency offset between the point A and a lowest subcarrier of a lowest resource block that overlaps a SS/PBCH block used by the UE for initial cell selection, and is expressed in units of resource blocks assuming 15 kHz subcarrier spacing for FR1 and 60 kHz subcarrier spacing for FR2;

absoluteFrequencyPointA represents frequency-location of the point A expressed as in absolute radio-frequency channel number (ARFCN).

The common resource blocks are numbered from 0 and upwards in the frequency domain for subcarrier spacing configuration μ.

The center of subcarrier 0 of common resource block 0 for the subcarrier spacing configuration μ coincides with 'point A'. A common resource block number $n_{CRB}^\mu$ in the frequency domain and resource elements (k, l) for the subcarrier spacing configuration may be given by the following Equation 1.

$$n_{CRB}^\mu = \left\lfloor \frac{k}{N_{sc}^{RB}} \right\rfloor \quad \text{[Equation 1]}$$

Here, k may be defined relative to the point A so that k=0 corresponds to a subcarrier centered around the point A. Physical resource blocks are defined within a bandwidth part (BWP) and are numbered from 0 to $N_{BWP,i}^{size}-1$, where i is No. Of the BWP. A relation between the physical resource block $n_{PRB}$ in BWP i and the common resource block $n_{CRB}$ may be given by the following Equation 2.

$$n_{CRB} = n_{PRB} + N_{BWP,i}^{start} \quad \text{[Equation 2]}$$

Here, $N_{BWP,i}^{start}$ may be the common resource block where the BWP starts relative to the common resource block 0.

Physical Channel and General Signal Transmission

FIG. 6 illustrates physical channels and general signal transmission used in a 3GPP system. In a wireless communication system, the UE receives information from the eNB through Downlink (DL) and the UE transmits information from the eNB through Uplink (UL). The information which the eNB and the UE transmit and receive includes data and various control information and there are various physical channels according to a type/use of the information which the eNB and the UE transmit and receive.

When the UE is powered on or newly enters a cell, the UE performs an initial cell search operation such as synchronizing with the eNB (S601). To this end, the UE may receive a Primary Synchronization Signal (PSS) and a (Secondary Synchronization Signal (SSS) from the eNB and synchronize with the eNB and acquire information such as a cell ID or the like. Thereafter, the UE may receive a Physical Broadcast Channel (PBCH) from the eNB and acquire in-cell broadcast information. Meanwhile, the UE receives a Downlink Reference Signal (DL RS) in an initial cell search step to check a downlink channel status.

A UE that completes the initial cell search receives a Physical Downlink Control Channel (PDCCH) and a Physical Downlink Control Channel (PDSCH) according to information loaded on the PDCCH to acquire more specific system information (S602).

Meanwhile, when there is no radio resource first accessing the eNB or for signal transmission, the UE may perform a Random Access Procedure (RACH) to the eNB (S603 to S606). To this end, the UE may transmit a specific sequence to a preamble through a Physical Random Access Channel (PRACH) (S603 and S605) and receive a response message (Random Access Response (RAR) message) for the preamble through the PDCCH and a corresponding PDSCH. In the case of a contention based RACH, a Contention Resolution Procedure may be additionally performed (S606).

The UE that performs the above procedure may then perform PDCCH/PDSCH reception (S607) and Physical Uplink Shared Channel (PUSCH)/Physical Uplink Control Channel (PUCCH) transmission (S608) as a general uplink/downlink signal transmission procedure. In particular, the UE may receive Downlink Control Information (DCI) through the PDCCH. Here, the DCI may include control information such as resource allocation information on the UE and formats may be differently applied according to a use purpose.

Meanwhile, the control information which the UE transmits to the eNB through the uplink or the UE receives from the eNB may include a downlink/uplink ACK/NACK signal, a Channel Quality Indicator (CQI), a Precoding Matrix Index (PMI), a Rank Indicator (RI), and the like. The UE may transmit the control information such as the CQI/PMI/RI, etc., through the PUSCH and/or PUCCH.

Beam Management (BM)

A BM procedure as layer 1 (L1)/layer 2 (L2) procedures for acquiring and maintaining a set of base station (e.g., gNB, TRP, etc.) and/or terminal (e.g., UE) beams which may be used for downlink (DL) and uplink (UL) transmission/reception may include the following procedures and terms.

Beam measurement: Operation of measuring characteristics of a beam forming signal received by the eNB or UE.

Beam determination: Operation of selecting a transmit (Tx) beam/receive (Rx) beam of the eNB or UE by the eNB or UE.

Beam sweeping: Operation of covering a spatial region using the transmit and/or receive beam for a time interval by a predetermined scheme.

Beam report: Operation in which the UE reports information of a beamformed signal based on beam measurement.

The BM procedure may be divided into (1) a DL BM procedure using a synchronization signal (SS)/physical broadcast channel (PBCH) Block or CSI-RS and (2) a UL BM procedure using a sounding reference signal (SRS). Further, each BM procedure may include Tx beam sweeping for determining the Tx beam and Rx beam sweeping for determining the Rx beam.

Downlink Beam Management (DL BM)

The DL BM procedure may include (1) transmission of beamformed DL reference signals (RSs) (e.g., CIS-RS or SS Block (SSB)) of the eNB and (2) beam reporting of the UE.

Here, the beam reporting a preferred DL RS identifier (ID)(s) and L1-Reference Signal Received Power (RSRP).

The DL RS ID may be an SSB Resource Indicator (SSBRI) or a CSI-RS Resource Indicator (CRI).

FIG. 7 illustrates an example of beamforming using a SSB and a CSI-RS.

As illustrated in FIG. 7, a SSB beam and a CSI-RS beam may be used for beam measurement. A measurement metric is L1-RSRP per resource/block. The SSB may be used for coarse beam measurement, and the CSI-RS may be used for fine beam measurement. The SSB may be used for both Tx beam sweeping and Rx beam sweeping. The Rx beam sweeping using the SSB may be performed while the UE changes Rx beam for the same SSBRI across multiple SSB bursts. One SS burst includes one or more SSBs, and one SS burst set includes one or more SSB bursts.

DL BM Related Beam Indication

A UE may be RRC-configured with a list of up to M candidate transmission configuration indication (TCI) states at least for the purpose of quasi co-location (QCL) indication, where M may be 64.

Each TCI state may be configured with one RS set. Each ID of DL RS at least for the purpose of spatial QCL (QCL Type D) in an RS set may refer to one of DL RS types such as SSB, P-CSI RS, SP-CSI RS, A-CSI RS, etc.

Initialization/update of the ID of DL RS(s) in the RS set used at least for the purpose of spatial QCL may be performed at least via explicit signaling.

Table 5 represents an example of TCI-State IE.

The TCI-State IE associates one or two DL reference signals (RSs) with corresponding quasi co-location (QCL) types.

TABLE 5

```
-- ASN1START
-- TAG-TCI-STATE-START
TCI-State ::=              SEQUENCE {
    tci-StateId                TCI-StateId,
    qcl-Type1                  QCL-Info,
    qcl-Type2                  QCL-Info
    ...
}
QCL-Info ::=               SEQUENCE {
    cell                       ServCellIndex
    bwp-Id                     BWP-Id
    referenceSignal            CHOICE {
        csi-rs                     NZP-CSI-RS-ResourceId,
        ssb                        SSB-Index
    },
```

TABLE 5-continued

| qcl-Type | ENUMERATED {typeA, typeB, typeC, typeD}, |
|---|---|

}
-- TAG-TCI-STATE-STOP
-- ASN1STOP

In Table 5, bwp-Id parameter represents a DL BWP where the RS is located, cell parameter represents a carrier where the RS is located, and reference signal parameter represents reference antenna port(s) which is a source of quasi co-location for corresponding target antenna port(s) or a reference signal including the one. The target antenna port(s) may be CSI-RS, PDCCH DMRS, or PDSCH DMRS. As an example, in order to indicate QCL reference RS information on NZP CSI-RS, the corresponding TCI state ID may be indicated to NZP CSI-RS resource configuration information. As another example, in order to indicate QCL reference information on PDCCH DMRS antenna port(s), the TCI state ID may be indicated to each CORESET configuration. As another example, in order to indicate QCL reference information on PDSCH DMRS antenna port(s), the TCI state ID may be indicated via DCI.

Quasi-Co Location (QCL)

The antenna port is defined so that a channel over which a symbol on an antenna port is conveyed may be inferred from a channel over which another symbol on the same antenna port is conveyed. When properties of a channel over which a symbol on one antenna port is conveyed may be inferred from a channel over which a symbol on another antenna port is conveyed, the two antenna ports may be considered as being in a quasi co-located or quasi co-location (QC/QCL) relationship.

The channel properties include one or more of delay spread, Doppler spread, frequency/Doppler shift, average received power, received timing/average delay, and spatial RX parameter. The spatial Rx parameter means a spatial (reception) channel property parameter such as an angle of arrival.

The UE may be configured with a list of up to M TCI-State configurations within the higher layer parameter PDSCH-Config to decode PDSCH according to a detected PDCCH with DCI intended for the corresponding UE and a given serving cell, where M depends on UE capability.

Each TCI-State contains parameters for configuring a quasi co-location relationship between one or two DL reference signals and the DM-RS ports of the PDSCH.

The quasi co-location relationship is configured by the higher layer parameter qcl-Type1 for the first DL RS and qcl-Type2 for the second DL RS (if configured). For the case of two DL RSs, the QCL types are not be the same, regardless of whether the references are to the same DL RS or different DL RSs.

The quasi co-location types corresponding to each DL RS are given by the higher layer parameter qcl-Type of QCL-Info and may take one of the following values:
  'QCL-TypeA': {Doppler shift, Doppler spread, average delay, delay spread}
  'QCL-TypeB': {Doppler shift, Doppler spread}
  'QCL-TypeC': {Doppler shift, average delay}
  'QCL-TypeD': {Spatial Rx parameter}

For example, if a target antenna port is a specific NZP CSI-RS, the corresponding NZP CSI-RS antenna ports may be indicated/configured to be QCLed with a specific TRS in terms of QCL-TypeA and with a specific SSB in terms of QCL-TypeD. The UE receiving the indication/configuration may receive the corresponding NZP CSI-RS using the Doppler or delay value measured in the QCL-TypeA TRS and apply the Rx beam used for QCL-TypeD SSB reception to the reception of the corresponding NZP CSI-RS reception.

The UE may receive an activation command by MAC CE signaling used to map up to eight TCI states to the codepoint of the DCI field 'Transmission Configuration Indication'.

UL BM Procedure

A UL BM may be configured such that beam reciprocity (or beam correspondence) between Tx beam and Rx beam is established or not established depending on the UE implementation. If the beam reciprocity between Tx beam and Rx beam is established in both a base station and a UE, a UL beam pair may be adjusted via a DL beam pair. However, if the beam reciprocity between Tx beam and Rx beam is not established in any one of the base station and the UE, a process for determining the UL beam pair is necessary separately from determining the DL beam pair.

Even when both the base station and the UE maintain the beam correspondence, the base station may use a UL BM procedure for determining the DL Tx beam even if the UE does not request a report of a (preferred) beam.

The UM BM may be performed via beamformed UL SRS transmission, and whether to apply UL BM of a SRS resource set is configured by the (higher layer parameter) usage. If the usage is set to 'BeamManagement (BM)', only one SRS resource may be transmitted to each of a plurality of SRS resource sets in a given time instant.

The UE may be configured with one or more sounding reference symbol (SRS) resource sets configured by (higher layer parameter) SRS-ResourceSet (via higher layer signaling, RRC signaling, etc.). For each SRS resource set, the UE may be configured with K≥1 SRS resources (higher later parameter SRS-resource), where K is a natural number, and a maximum value of K is indicated by SRS capability.

In the same manner as the DL BM, the UL BM procedure may be divided into a UE's Tx beam sweeping and a base station's Rx beam sweeping.

FIG. 8 illustrates an example of an UL BM procedure using a SRS.

More specifically, (a) of FIG. 8 illustrates an Rx beam determination procedure of a base station, and (a) of FIG. 8 illustrates a Tx beam sweeping procedure of a UE.

FIG. 9 is a flow chart illustrating an example of an UL BM procedure using a SRS.

The UE receives, from the base station, RRC signaling (e.g., SRS-Config IE) including (higher layer parameter) usage parameter set to 'beam management' in S910.

Table 6 represents an example of SRS-Config information element (IE), and the SRS-Config IE is used for SRS transmission configuration. The SRS-Config IE contains a list of SRS-Resources and a list of SRS-Resource sets. Each SRS resource set means a set of SRS resources.

The network may trigger transmission of the SRS resource set using configured aperiodicSRS-ResourceTrigger (L1 DCI).

TABLE 6

```
-- ASN1START
-- TAG-MAC-CELL-GROUP-CONFIG-START
SRS-Config ::=                              SEQUENCE {
    srs-ResourceSetToReleaseList                SEQUENCE (SIZE(1..maxNrofSRS-
ResourceSets)) OF SRS-ResourceSetId             OPTIONAL,         -- Need N
    srs-ResourceSetToAddModList                 SEQUENCE (SIZE(1..maxNrofSRS-
ResourceSets)) OF SRS-ResourceSet                OPTIONAL,         -- Need N
    srs-ResourceToReleaseList                   sequence (size(1..maxNrofSRS-
Resources)) OF SRS-ResourceId                   OPTIONAL,         -- Need N
    srs-ResourceToAddModList                    SEQUENCE (SIZE(1..maxNrofSRS-
Resources)) OF SRS-Resource                     OPTIONAL,         -- Need N
    tpc-Accumulation                            ENUMERATED {disabled.}
    ...
}
SRS-ResourceSet ::=                         SEQUENCE {
    srs-ResourceSetId                           SRS-ResourceSetId,
    srs-ResourceIdList                          SEQUENCE (SIZE(1..maxNrofSRS-
ResourcesPerSet)) OF SRS-ResourceId             OPTIONAL, -- Cond Setup
    resourceType                                CHOICE {
        aperiodic                                   SEQUENCE {
            aperiodicSRS-ResourceTrigger                INTEGER (1..maxNrofSRS-
TriggerStates-1) ,
            csi-RS                                      NZP-CSI-RS-ResourceId
            slotOffset                                  INTEGER (1..32)
            ...
        },
        semi-persistent                             SEQUENCE {
            associatedCSI-RS                            NZP-CSI-RS-ResourceId
            ...
        },
        periodic                                    SEQUENCE {
            associatedCSI-RS                            NZP-CSI-RS-ResourceId
            ...
        }
    },
    usage                                       ENUMERATED {beamManagement,
codebook, nonCodebook, antennaSwitching},
    alpha                                       Alpha
    p0                                          INTEGER (-202..24)
    pathlossReferenceRS                         CHOICE {
        ssb-Index                                   SSB-Index,
        csi-RS-Index                                NZP-CSI-RS-ResourceId
SRS-SpatialRelationInfo ::=                 SEQUENCE {
    servingCellId                               ServCellIndex
    referenceSignal                             CHOICE {
        ssb-Index                                   SSB-Index,
        csi-RS-Index                                NZP-CSI-RS-ResourceId,
        srs                                         SEQUENCE {
            resourceId                                  SRS-ResourceId,
            uplinkBWP                                   BWP-Id
        }
    }
}
SRS-ResourceId ::=                          INTEGER (0..maxNrofSRS-Resources-1)
```

In Table 6, usage refers to a higher layer parameter to indicate whether the SRS resource set is used for beam management or is used for codebook based or non-codebook based transmission. The usage parameter corresponds to L1 parameter 'SRS-SetUse'. 'spatialRelationInfo' is a parameter representing a configuration of spatial relation between a reference RS and a target SRS. The reference RS may be SSB, CSI-RS, or SRS which corresponds to L1 parameter 'SRS-SpatialRelationInfo'. The usage is configured per SRS resource set.

The UE determines the Tx beam for the SRS resource to be transmitted based on SRS-SpatialRelation Info contained in the SRS-Config IE in S920. The SRS-SpatialRelation Info is configured per SRS resource and indicates whether to apply the same beam as the beam used for SSB, CSI-RS, or SRS per SRS resource. Further, SRS-SpatialRelationInfo may be configured or not configured in each SRS resource.

If the SRS-SpatialRelationInfo is configured in the SRS resource, the same beam as the beam used for SSB, CSI-RS or SRS is applied for transmission. However, if the SRS-SpatialRelationInfo is not configured in the SRS resource, the UE randomly determines the Tx beam and transmits the SRS via the determined Tx beam in S930.

More specifically, for P-SRS with 'SRS-ResourceConfigType' set to 'periodic':

i) if SRS-SpatialRelationInfo is set to 'SSB/PBCH,' the UE transmits the corresponding SRS resource with the same spatial domain transmission filter (or generated from the corresponding filter) as the spatial domain Rx filter used for the reception of the SSB/PBCH; or ii) if SRS-SpatialRelationInfo is set to 'CSI-RS,' the UE transmits the SRS resource with the same spatial domain transmission filter used for the reception of the periodic CSI-RS or SP CSI-RS; or iii) if SRS-SpatialRelationInfo is set to 'SRS,' the UE transmits the SRS resource with the same spatial domain transmission filter used for the transmission of the periodic SRS.

Even if 'SRS-ResourceConfigType' is set to 'SP-SRS' or 'AP-SRS,' the beam determination and transmission operations may be applied similar to the above.

Additionally, the UE may receive or may not receive feedback for the SRS from the base station, as in the following three cases in S940.

i) If Spatial_Relation_Info is configured for all the SRS resources within the SRS resource set, the UE transmits the SRS with the beam indicated by the base station. For example, if the Spatial_Relation_Info indicates all the same SSB, CRI, or SRI, the UE repeatedly transmits the SRS with the same beam. This case corresponds to (a) of FIG. 8 as the usage for the base station to select the Rx beam.

ii) The Spatial_Relation_Info may not be configured for all the SRS resources within the SRS resource set. In this case, the UE may perform transmission while freely changing SRS beams. That is, this case corresponds to (b) of FIG. 8 as the usage for the UE to sweep the Tx beam.

iii) The Spatial_Relation_Info may be configured for only some SRS resources within the SRS resource set. In this case, the UE may transmit the configured SRS resources with the indicated beam, and transmit the SRS resources, for which Spatial_Relation_Info is not configured, by randomly applying the Tx beam.

PUCCH Beam Indication

When the BS instructs a terminal to use a beam for PUCCH transmission, the BS may indicate/configure spatial relation information like SRS. The spatial relation information may be SSB, CSI-RS, or SRS, like SRS, and provides reference RS information from a viewpoint of a beam to be used for PUCCH transmission as a target. In the case of PUCCH, a beam may be (differently) configured/indicated in units of PUCCH resource, and two methods are supported. A first method is a method of always applying the corresponding spatial relation RS to transmit the corresponding PUCCH when one spatial relation information is set with an RRC message (i.e., RRC only). A second method is a method of indicating a specific one to be applied to a target PUCCH resource among a plurality of spatial relation RS information set as RRC with a MAC-CE message after setting two or more spatial relation information with an RRC message (i.e., RRC+MAC-CE).

PUSCH Beam Indication

When the BS instructs the UE to use the beam to be used for PUSCH transmission in DCI format 0_1, the BS may indicate an SRS resource as a reference. In NR PUSCH transmission, two methods are supported: a codebook (CB) based transmission method and a non-codebook based transmission method. Similar to LTE UL MIMO, the CB based transmission method indicates precoder information to be applied to a plurality of UE antenna ports by DCI through TPMI and TRI. However, unlike LTE, beamformed SRS resource transmission is supported, and a maximum of two SRS resources may be configured for CB based transmission. Since each SRS resource may be set with different spatial relation information, it may be transmitted while beamforming in different directions. Upon receiving this, the BS may designate one of the two beams to be used when applying the PUSCH as a 1-bit SRI (SRS resource ID) field. For example, when a 4 Tx UE is set two 4-port SRS resources and each SRS resource is set different spatial relation RSs, each SRS resource s beamformed according to each spatial relation RS and transmitted to 4 ports. The BS selects and indicates one of the two SRS resources as the SRI, and at the same time indicates TPMI and TRI by UL DCI as MIMO precoding information to be applied to the SRS ports used to transmit the corresponding SRS resource.

In non-CB based transmission, the UE may be set up to 4 1 port SRS resources. Upon receiving this instruction, the UE performs beamforming for each SRS resource according to the corresponding spatial relation information and transmits it to the BS, and, upon receiving it, the BS indicates one or a plurality of SRI(s) to be applied to PUSCH transmission. Unlike the CB based method, in the non-CB method, each SRS resource includes only 1 port, and thus, TPMI is not indicated. As a result, the number of indicated SRS resources (i.e., the number of SRIs) is the same as the transmission rank, so TRI is not indicated. As a result, each indicated 1 port SRS resource is applied with the same beamforming (precoding) as a specific PUSCH DMRS port (or layer). In non-CB UL transmission, a specific NZP CSI-RS resource may be associated with each SRS resource by RRC (associated CSI-RS IE in 38.331), and in this case, when the aperiodic SRS for the non-CB is triggered by DCI, the associated NZP CSI-RS is also triggered. At this time, the UE receives the triggered NZP CSI-RS, calculates a beam coefficient (or precoder) to be applied to each SRS resource (using channel reciprocity), and then transmits the SRS resources (sequentially).

When the BS schedules the PUSCH in DCI format 0_0, the direct beam indication method through DCI is not supported because the SRI field in the CB based or non-CB based transmission does not exist in DCI format 0_0. At this time, the UE transmits the corresponding PUSCH using the same beam as the beam to be applied to transmission of the PUCCH resource having the lowest ID among the PUCCH resources configured in an active BWP of the corresponding cell (i.e., the spatial relation information is the same).

CSI Measurement and Reporting Procedure

The NR system supports more flexible and dynamic CSI measurement and reporting.

The CSI measurement may include a procedure for receiving a CSI-RS and acquiring CSI by computing the received CSI-RS.

As time domain behavior of CSI measurement and reporting, aperiodic/semi-persistent/periodic CM (channel measurement) and IM (interference measurement) are supported.

A 4-port NZP CSI-RS RE pattern is used for the configuration of the CSI-IM.

CSI-IM-based IMR of NR has a design similar to that of CSI-IM of LTE, and is configured independently of ZP CSI-RS resources for PDSCH rate matching.

Also, each port in the NZP CSI-RS-based IMR emulates an interference layer having (preferred channel and) precoded NZP CSI-RS.

This is for intra-cell interference measurement for a multi-user case, and mainly targets MU interference.

The BS transmits a precoded NZP CSI-RS to the UE on each port of the configured NZP CSI-RS based IMR.

The UE assumes a channel/interference layer for each port in a resource set and measures interference.

For a channel, if there is no PMI and RI feedback, a plurality of resources are set in the set, and the BS or network indicates a subset of NZP CSI-RS resources for channel/interference measurement through DCI.

Resource setting and resource setting configuration will be described in more detail.

Resource Setting

Each CSI resource setting 'CSI-ResourceConfig' includes a configuration for S≥1 CSI resource set (given by the higher layer parameter CSI-RS-ResourceSetList).

Here, the CSI resource setting corresponds to the CSI-RS-resourcesetlist.

Here, S represents the number of set CSI-RS resource set.

Here, the configuration for S≥1 CSI resource set includes each CSI resource set including CSI-RS resources (consisting of NZP CSI-RS or CSI-IM) and SS/PBCH block (SSB) resource used L1-RSRP computation.

Each CSI resource setting is located in a DL BWP (bandwidth part) identified by a higher layer parameter bwp-id.

Also, all CSI resource settings linked to the CSI reporting setting have the same DL BWP.

A time domain behavior of the CSI-RS resource within the CSI resource setting included in the CSI-ResourceConfig IE is indicated by a higher layer parameter resourceType and may be set aperiodically, periodically, or semi-persistently.

For the periodic and semi-persistent CSI resource setting, the number (S) of set CSI-RS resource sets is limited to '1'.

For periodic and semi-persistent CSI resource setting, the set (periodicity and slot offset are given in numerology of the associated DL BWP, as given by the bwp-id.

When the UE is configured with multiple CSI-ResourceConfigs including the same NZP CSI-RS resource ID, the same time domain behavior is set for the CSI-ResourceConfig.

When the UE is configured with multiple CSI-ResourceConfigs including the same CSI-IM resource ID, the same time domain behavior is configured for the CSI-ResourceConfig.

Next, one or more CSI resource settings for channel measurement (CM) and interference measurement (IM) are configured through higher layer signaling.

CSI-IM resource for interference measurement.

NZP CSI-RS resource for interference measurement.

NZP CSI-RS resource for channel measurement.

That is, a channel measurement resource (CMR) may be an NZP CSI-RS for CSI acquisition, and an interference measurement resource (IMR) may be a CSI-IM and an NZP CSI-RS for IM.

Here, CSI-IM (or ZP CSI-RS for IM) is mainly used for inter-cell interference measurement.

Also, the NZP CSI-RS for IM is mainly used for intra-cell interference measurement from multi-users.

The UE may assume that CSI-RS resource(s) for channel measurement and CSI-IM/NZP CSI-RS resource(s) for interference measurement configured for one CSI reporting are 'QCL-TypeD' for each resource.

Resource Setting Configuration

As described above, resource setting may refer to a resource set list.

For aperiodic CSI, each trigger state set using the higher layer parameter CSI-AperiodicTriggerState is related to one or more CSI-ReportConfig in which each CSI-ReportConfig is linked to a periodic, semi-persistent or aperiodic resource setting.

One reporting setting may be connected with up to three resource settings.

If one resource setting is configured, the resource setting (given by the higher layer parameter resourcesForChannelMeasurement) is for channel measurement for L1-RSRP computation.

If two resource settings are configured, first resource setting (given by the higher layer parameter resourcesForChannelMeasurement) is for channel measurement, and second resource setting (given by CSI-IM-ResourcesForInterference or nzp-CSI-RS-ResourcesForInterference) is for interference measurement performed on CSI-IM or NZP CSI-RS.

If three resource settings are configured, first resource setting (given by resourcesForChannelMeasurement) is for channel measurement, second resource setting (given by csi-IM-ResourcesForInterference) is for CSI-IM based interference measurement, and third resource setting (given by nzp-CSI-RS-ResourcesForInterference) is for NZP CSI-RS based interference measurement.

For semi-persistent or periodic CSI, each CSI-ReportConfig is linked to a periodic or semi-persistent resource setting.

If one resource setting (given by resourcesForChannelMeasurement) is configured, the resource setting is for channel measurement for L1-RSRP computation.

If two resource settings are configured, first resource setting (given by resourcesForChannelMeasurement) is for channel measurement, and second resource setting (given by the higher layer parameter csi-IM-ResourcesForInterference) is used for interference measurement performed on CSI-IM.

CSI computation related to CSI measurement will be described.

When interference measurement is performed on CSI-IM, each CSI-RS resource for channel measurement is associated with CSI-IM resource by the order of CSI-RS resources and CSI-IM resources in the corresponding resource set.

The number of CSI-RS resources for channel measurement is the same as the number of CSI-IM resources.

Also, when interference measurement is performed in the NZP CSI-RS, the UE does not expect to be set to one or more NZP CSI-RS resources in the resource set associated with the resource setting for channel measurement.

The UE in which higher layer parameter nzp-CSI-RS-ResourcesForInterference is configured does not expect that 18 or more NZP CSI-RS ports will be configured in the NZP CSI-RS resource set.

For CSI measurement, the UE assumes the following.

Each NZP CSI-RS port configured for interference measurement corresponds to an interference transport layer.

All interference transport layers of the NZP CSI-RS port for interference measurement consider an energy per resource element (EPRE) ratio.

Another interference signal on RE(s) of the NZP CSI-RS resource for channel measurement, NZP CSI-RS resource for measuring interference, or CSI-IM resource for interference measurement.

A CSI reporting procedure will be described in more detail.

For CSI reporting, time and frequency resources available to the UE are controlled by the BS.

CSI (channel state information) may include at least one of a channel quality indicator (CQI), precoding matrix indicator (PMI), CSI-RS resource indicator (CRI), SS/PBCH block resource indicator (SSBRI), layer indicator (LI), rank indicator (RI) or L1-RSRP.

For CQI, PMI, CRI, SSBRI, LI, RI, and L1-RSRP, the UE is set by higher layer with N≥1 CSI-ReportConfig reporting setting, M≥1 CSI-ResourceConfig resource setting, and a list of one or two trigger states (provided by aperiodicTriggerStateList and semiPersistentOnPUSCH-TriggerStateList).

In the aperiodicTriggerStateList, each trigger state includes a channel and optionally an associated CSI-Reportconfigs list indicating resource set IDs for interference.

In the semiPersistentOnPUSCH-TriggerStateList, each trigger state includes one associated CSI-ReportConfig.

Also, a time domain behavior of CSI reporting supports periodic, semi-persistent, aperiodic.

Hereinafter, periodic, semi-persistent (SP), and aperiodic CSI reporting will be described.

Periodic CSI reporting is performed on short PUCCH and long PUCCH.

Periodic CSI reporting periodicity and slot offset may be set by RRC and refer to the CSI-ReportConfig IE.

Next, SP CSI reporting is performed on short PUCCH, long PUCCH, or PUSCH.

In the case of SP CSI on short/long PUCCH, periodicity and slot offset are set by RRC, and CSI reporting is activated/deactivated by a separate MAC CE.

In case of SP CSI on PUSCH, periodicity of SP CSI reporting is set by RRC, but slot offset is not set by RRC, and SP CSI reporting is activated/deactivated by DCI (format 0_1).

The initial CSI reporting timing follows the PUSCH time domain allocation value indicated by DCI, and the subsequent CSI reporting timing follows a cycle set by the RRC.

For SP CSI reporting on PUSCH, a separate RNTI (SP-CSI C-RNTI) is used.

DCI format 0_1 includes a CSI request field, and may activate/deactivation a specific configured SP-CSI trigger state.

Also, SP CSI reporting has the same or similar activation/deactivation as the mechanism with data transmission on the SPS PUSCH.

Next, aperiodic CSI reporting is performed on PUSCH and is triggered by DCI.

In case of AP CSI having AP CSI-RS, an AP CSI-RS timing is set by RRC.

Here, the timing for AP CSI reporting is dynamically controlled by DCI.

In NR, a method of dividing and reporting CSI in multiple reporting instances applied to PUCCH-based CSI reporting in LTE (e.g., transmitted in order of RI, WB PMI/CQI, SB PMI/CQI) is not applied.

Instead, NR limits the configuration of a specific CSI report in short/long PUCCH, and a CSI omission rule is defined.

Also, in relation to AP CSI reporting timing, PUSCH symbol/slot location is dynamically indicated by DCI. Also, candidate slot offsets are set by RRC.

For CSI reporting, slot offset (Y) is configured for each reporting setting.

For UL-SCH, slot offset K2 is configured separately.

Two CSI latency classes (low latency class, high latency class) are defined in terms of CSI computation complexity.

Low latency CSI is WB CSI including a maximum of 4 ports Type-I codebook or a maximum of 4-ports non-PMI feedback CSI.

High latency CSI refers to CSI other than the low latency CSI.

For a normal UE, (Z, Z') is defined in the unit of OFDM symbols.

Z represents a minimum CSI processing time from receiving aperiodic CSI triggering DCI to performing CSI reporting.

Z' represents a minimum CSI processing time from receiving CSI-RS for channel/interference to performing CSI reporting.

Additionally, the UE reports the number of CSIs that may be simultaneously calculated.

The above contents (3GPP system, frame structure, NR system, etc.) may be applied in combination with the methods proposed in the present disclosure to be described later or may be supplemented to clarify the technical characteristics of the methods proposed in the present disclosure.

In this disclosure, '/' refers to 'and', 'or', or 'and/or' depending on the context.

The aforementioned Rel-15 NR UL BM and PUCCH/PUSCH beam indication schemes are designed in consideration of both a beam correspondence UE and a non-beam correspondence UE. However, there is a disadvantage of causing unnecessary signaling overhead due to low flexibility for beam change as shown below.

In the case of a physical uplink control channel (PUCCH), in order to change a beam, RRC reconfiguration and/or MAC-CE message transmission is required to update spatial relation information.

In the case of a codebook-based physical uplink shared channel (CB based PUSCH), the following operations are required to change to a beam other than the beam applied to the SRS resource(s) of the codebook usage. Specifically, the BS reconfigures a spatial relation of the SRS resource(s) configured to usage='CB' to RRC and the UE needs to transmit the corresponding SRS resource(s).

In the case of a non-codebook-based physical uplink shared channel (non-CB based PUSCH), the following operations are required to change to a beam other than the beam applied to the SRS resource(s) for non-CB usage. Specifically, the BS needs to reconfigure the spatial relation or associated CSI-RS (associatedCSI-RS) of the SRS resource(s) configured to usage='non-CB' by RRC and transmit the corresponding SRS resource(s) to the UE.

In the case of a PUSCH scheduled by downlink control information of DCI format 0_0, the following operations are required to change a beam. Spatial relation information of the PUCCH resource corresponding to the lowest PUCCH ID of the corresponding bandwidth part (BWP) should be updated. The BS should transmit an RRC reconfiguration and/or MAC-CE message to update spatial relationship information of the corresponding PUCCH resource.

In order to overcome the disadvantage of low flexibility related to beam change as described above, in particular, in the case of a beam correspondence UE, a method of setting a spatial relation RS or associated CSI-RS as UE-specifically beamformed CSI-RS and using the same may be considered. That is, a beam to be applied to the corresponding NZP CSI-RS is changed according to movement/rotation of the corresponding UE. The method may cause a problem of consuming too much downlink reference signal (DL RS) resources in the case of a BS having a large number of UEs. After all, in such a BS, it is much more efficient to apply cell/TRP-specific beamformed CSI-RS. In this case, frequent beam change according to the movement of the UE causes the above signaling burden.

In addition, various methods for considering multiple panels of the UE are being discussed. As an example, a method of defining a panel with an SRS resource set which is a unit for grouping one or a plurality of SRS resources when it is considered that the existing SRS resource ID refers to an SRS transmission beam ID (SRS Tx beam ID) is being discussed. As another example, a method of introducing an explicit separate ID is being discussed. In the latter case, a panel ID or group ID may be attached to each SRS resource. After all, if an implicit method, an explicit method, or a panel ID is introduced, not only the UL beam change but also the UL panel change may need to be indicated according to a UL channel state. As a result, a larger signaling/resource overhead may be caused due to the panel ID of the UE.

In this disclosure, in order to solve the aforementioned problem, methods for dynamically changing an uplink panel/beam, while minimizing signaling overhead, are proposed. Of course, the methods described below are only divided for convenience of description, and some components of one method may be substituted with some components of another method, or may be applied in combination with each other.

Hereinafter, a method related to panel/beam indication in ACK/NACK PUCCH/PUSCH transmission will be described.

[Method 1]

A method of transmitting a physical uplink control channel (PUCCH) through an uplink beam/panel corresponding to a transmission configuration indicator (TCI) of a physical downlink shared channel (PDSCH) may be considered.

Specifically, for the PUCCH resource, the downlink beam reference signal of the PDSCH (DL beam RS, DL RS related to QCL type D) may be configured/indicated/applied as a spatial relation RS of the PUCCH. According to an embodiment, the PUCCH may include ACK/NACK for the PDSCH.

By aligning a UL transmission beam corresponding to a DL reception beam of the corresponding PDSCH to be used for the corresponding PUCCH, the UL beam/panel may be automatically changed through the DL reception beam change when the UE moves. Accordingly, a procedure or signaling for a separate UL beam/panel change may be omitted.

According to an embodiment, the aforementioned method may be limitedly used when spatial relation information is not configured in the corresponding PUCCH resource and/or when a mode for applying the method 1 is explicitly indicated (e.g., spatial relation information='flexible' or 'null') in order to prevent collision with the existing PUCCH beam indication method.

The 'TCI of the PDSCH' refers to (Type D) QCL reference RS information configured/indicated for the corresponding PDSCH. The 'TCI of the PDSCH' may be determined in the same way as a DL beam indication mechanism.

The 'TCI of the PDSCH' may be determined by the PDCCH TCI scheduling the corresponding PDSCH in the case of Is-TCI-present=OFF.

In the case of Is-TCI-present=ON, the 'TCI of the PDSCH' may be determined by the TCI indicated by the DCI of the PDCCH scheduling the corresponding PDSCH (in the case after the scheduling offset) or by a default TCI (in the case within the scheduling offset). The default TCI refers to quasi-colocation information (QCI) to be applied when the UE performs buffering until the UE completes decoding of a beam indication with DCI.

The default TCI is a TCI applied to a specific set of control resources (determined by an agreed rule). The specific control resource set may be the control resource set (CORESET) associated with a monitored search space with the lowest CORESET-ID in the latest slot in which one or more CORESETs within the active BWP of the serving cell.

[Method 1-1]

When a plurality of ACK/NACKs for a plurality of PDSCHs are bundled and transmitted in a specific PUCCH resource, the following methods may be considered.

Method A)

The BS may schedule a plurality of PDSCHs corresponding to the same UL panel/beam. The UE may assume that the UL panels/beams corresponding to a plurality of TCI states for the plurality of PDSCHs are the same. Accordingly, the UE may transmit the PUCCH based on the UL panel/beam corresponding to any one of the plurality of TCI states.

The plurality of PDSCHs may be scheduled to satisfy the following.

According to an embodiment, a plurality of TCI states for the plurality of PDSCHs may be agreed to be the same. At least, the Type D QCL reference RS included in each of the plurality of TCI states may be the same.

According to an embodiment, a Type D QCL reference RS included in any one of the TCI states may be in a QCL relation with the Type D QCL reference RS included in the other TCI state among the remaining TCI states.

Method B)

The UE may transmit the PUCCH through a UL panel/beam corresponding to the TCI determined based on a specific rule.

The UE may select any one of the plurality of TCI states according to a specific rule, and transmit the PUCCH through a UL panel/beam corresponding to the TCI.

The TCI determined based on the 'specific rule' may be any one of 1) to 3) below.

1) The lowest or the highest TCI (state) ID among PDSCH TCIs or the first or the last TCI (state) among PDSCH TCIs 2) CORESET TCI for scheduling the plurality of PDSCHs 3) Default TCI (i.e., the TCI of the CORESET associated with a monitored search space with the lowest CORESET-ID in the latest slot in which one or more CORESETs within the active BWP of the serving cell)

Method C)

The UE may select one TCI state according to a rule set/indicated by the BS or a designated PDSCH (TCI) and transmit the PUCCH through a UL panel/beam corresponding to the TCI.

In applying method 1, the aforementioned method 1-1 (method A to method C) is a method for solving an ambiguity problem that may occur when ACK/NACK for a plurality of PDSCHs are bundled and transmitted in one PUCCH resource. Hereinafter, each method will be described in more detail.

In method A, in ACK/NACK bundling, the BS appropriately performs scheduling to satisfy any one of i) to iii): i) TCI for each PDSCH is the same ii) At least (Type D) QCL relationship is established between Type D QCL reference RSs of each PDSCH, iii) the UL panel/beam corresponding to a plurality of TCI states does not differ (as a case in which matching information between DL beam/panel and UE beam panel between the BS and the UE are shared). Accordingly, when the UE transmits the PUCCH for bundled ACK/NACK, ambiguity does not occur even if the UE determines the UL panel/beam based on any PDSCH among the plurality of PDSCHs.

Method B is a method of determining the PDSCH to be applied according to a rule agreed between the BS and the UE.

In method C, the BS sets/instructs the UE to determine a UL panel/beam based on which PDSCH (TCI) among the plurality of PDSCHs (TCI) or the BS sets/instructs the UE based on which of the plurality of PDSCHs (TCI) the UL panel/beam is to be determined.

[Method 2]

A method of transmitting a physical uplink shared channel (PUSCH) through an uplink beam/panel corresponding to the TCI of a physical downlink shared channel (PDSCH) may be considered.

According to an embodiment, when ACK/NACK for PDSCH(s) is transmitted (piggyback) to PUSCH (by a specific condition), (when there is no separate panel/beam indication for PUSCH and/or when it is separately configured/indicated to apply the proposed method), the corresponding ACK/NACK PUSCH may be transmitted through the UL beam/panel corresponding to the PDSCH TCI.

When ACK/NACK for a plurality of PDSCHs is bundled, method 1-1 may be applied to transmission of the PUSCH.

Specifically, Method 1 and Method 1-1 may be equally applied to cases in which ACK/NACK is transmitted in PUSCH (according to a specific condition).

For example, if a PUSCH resource is allocated to a PUCCH transmission symbol/slot, ACK/NACK may be sent along with data to the PUSCH without sending the PUCCH, and at this time, Method 1 and Method 1-1 may be applied to the corresponding PUSCH transmission.

In this case, there may be a separate panel/beam indication for the corresponding PUSCH (e.g., indication through SRI of DCI 0_1, indication through lowest ID PUCCH of DCI0_0, indication through associatedCSI-RS for non-CB UL). As described above, if there is a separate panel/beam indication for PUSCH, the above indication/configuration may be ignored and the above method 2 may be applied. Alternatively, only when there is no separate panel/beam indication/configuration for the PUSCH and/or when it is explicitly configured/instructed to apply method 2, method 2 may be limitedly applied. For example, this method may be applied to transmission of a scheduled PUSCH through DCI format0_0.

Hereinafter, a method related to panel/beam indication in CSI PUCCH/PUSCH transmission will be described.

In Method 1 and Method 2 described above, an implicit UL panel/beam configuration/indication method for PUCCH/PUSCH reporting ACK/NACK is proposed. Hereinafter, an implicit UL panel/beam configuration/instruction method for PUCCH/PUSCH reporting CSI will be described.

[Method 3]

A method of transmitting a physical uplink control channel (PUCCH) to a UL beam/panel corresponding to a measurement target of CSI may be considered.

Specifically, in the PUCCH panel/beam determination for the CSI PUCCH resource, the UE may transmit the corresponding PUCCH may be transmitted to the UL beam/panel corresponding to the (NZP)CSI-RS (or SSB) that is a measurement target of the CSI.

The CSI includes beam-related reporting information (e.g., CRI/SSBRI, RSRP, SINR, etc.) as well as precoding-related reporting information such as PMI, CQI, and RI. The CSI-RS (or SSB) resource may be indicated through a CSI report (setting) to which the corresponding PUCCH resource belongs.

According to the present embodiment, the UL panel/beam may be freely changed without reconfiguring spatial relation information for PUCCH by RRC or MAC-CE, so that signaling overhead may be reduced.

According to an embodiment, in order to prevent collision with the existing UL beam indication method, the aforementioned method may be limitedly used when spatial relation information is not set in the corresponding PUCCH resource and/or a mode applying the method 3 is explicitly indicated (e.g., spatial relation information='flexible' or 'null').

[Method 3-1]

When the CSI-RS (or SSB) includes a plurality of resources, the PUCCH may be transmitted based on a UL beam/panel corresponding to a CSI-RS (or SSB) resource selected and reported by the UE.

In addition, when it is configured to report a plurality of CRIs (or SSBRIs), the UE may transmit the corresponding PUCCH based on the UL beam/panel corresponding to a CSI-RS or SSB0 related to CRI (or SSBRI) having the best quality (e.g., RSRP, SINR, CQI) among the plurality of CRIs (or SSBRIs).

In applying method 3, the aforementioned method 3-1 is a method for solving a problem of ambiguity about based on which CSI-RS the UE should determine the UL panel/beam when there are a plurality of CSI-RSs (or SSBs) to be measured.

When it is configured to perform CSI reporting based on a plurality of CSI-RS (or SSB) resources, the UE selects N (best N) resources with good quality among the corresponding resources and selectively reports CSI for the N resources (N may be set by the BS).

When N=1, the UE selects the CSI-RS (or SSB) resource with the best quality, so that the UL beam/panel for PUCCH transmission may also be determined based on the resource. Considering the channel reciprocity properties of DL and UL, the PUCCH is highly likely to be transmitted through a UL panel/beam having high quality.

In addition, in the case of N>1, the UL panel/beam may be determined based on the CSI-RS (or SSB) having the best quality among the N CSI-RS (or SSB) resources. That is, the UE may determine a UL panel/beam based on a DL RS having the best quality among a plurality of DL RS (CSI-RS or SSB) resources or a DL RS determined based on a specific (separate) criterion and transmit CSI report information.

As described above, according to the present embodiment, the CSI PUCCH may be transmitted based on an excellent panel/beam with high probability without additional signaling.

[Method 3-2]

When a plurality of CSI reports (for different CSI-RS/SSB resource(s) configured in single or multiple component carrier (CC)/BWP) are transmitted in one PUCCH resource (e.g., multi-CSI PUCCH in NR Rel-15), the corresponding PUCCH may be transmitted as follows.

According to an embodiment, the UE may determine one CSI-RS (or SSB) from among a plurality of CSI-RSs (or SSBs) according to a specific rule and transmit the corresponding PUSCH based on a UL beam/panel corresponding to the CSI-RS (or SSB).

The CSI-RS (or SSB) based on the specific rule may be any one of 1) to 5) below.

1) CSI-RS/SSB having the lowest ID (lowest CSI-RS/SSB ID among selected per CSI report)
2) CSI-RS/SSB with the highest received quality
3) RS (set) in the component carrier (CC) with the lowest ID
4) RS (set) in the primary cell (PCell)
5) RS (set) in default/initial DL BWP in PCell According to an embodiment, after determining a UL panel/beam for each CSI reporting based on the aforementioned methods, the UE may determine a UL panel/beam according to a specific rule and transmit the PUCCH based on the corresponding UL panel/beam.

The UL panel/beam based on the specific rule may be related to any one of 1) to 4) below.

1) lowest PUCCH ID
2) lowest CSI report ID
3) CSI measured from the most recent DL RS
4) CSI on/for the lowest CC ID or PCell or the default/initial BWP in PCell In application of Method 3 and/or 3-1, Method 3-2 is a method for resolving ambiguity in UL panel/beam selection when transmitting a plurality of CSI report information in one PUCCH resource.

Basically, one CSI report is designed to be performed on one PUCCH resource, but when the transmission slot positions of the configured/indicated PUCCH resources overlap, the UE cannot transmit two or more PUCCH resources at the same time, or there may be a limit of transmission power.

In order to solve the above problem, a separate PUCCH resource capable of transmitting a plurality of CSI report information together (i.e., through UCI multiplexing) may be configured. Such a PUCCH resource is referred to as a multi-CSI PUCCH resource for convenience. In the case of CSI reporting through multi-CSI PUCCH, since the measurement RS (set) may be different for each CSI, when Method 3 and/or Method 3-1 is applied, the UL panel/beam selected for each CSI may be different.

In this case, i) a method of selecting a DL RS (set) according to a specific rule and then selecting a UL panel/beam corresponding to the DL RS (set) and ii) a method of selecting a UL panel/beam for each CSI reporting according to method 3 and/or 3-1 and then selecting a UL panel/beam among them according to a specific rule (when the corresponding UL panel/beam does not match) may be considered.

In ii), the specific rule may be based on a predefined CSI priority rule (CSI) for a case in which a size of a payload that may be sent in PUCCH/PUSCH is smaller than a total CSI payload when sending a plurality of CSIs (e.g., a beam report takes precedence over a CSI report). That is, the UL panel/beam may be determined based on the CSI report having the highest priority according to the CSI priority rule.

According to an embodiment, a rule to be applied by the BS, DL RS (set), CSI report, or BWP/CC ID may be designated/configured, instead of the specific rule. For example, in the case of multi-CSI PUCCH, the BS may designate BWP/CC ID(s) to select/apply a UL panel/beam based on a specific DL BWP/CC (set) or UL BWP/CC (set).

[Method 4]

A method of transmitting a physical uplink shared channel (PUSCH) to a UL beam/panel corresponding to a measurement target of CSI may be considered.

Specifically, in determining the PUSCH panel/beam for the CSI PUSCH resource, the UE may transmit the corresponding PUSCH in the UL beam/panel corresponding to the (NZP)CSI-RS (or SSB) that is a measurement target of the CSI.

The CSI includes not only precoding-related report information such as PMI, CQI, RI, but also beam-related report information (e.g., CRI/SSBRI, RSRP, SINR, etc.), and the CSI-RS (or SSB) resource may be indicated through the CSI report (setting) to which the corresponding PUSCH resource belongs.

When the above proposed method is applied, the UL panel/beam may be freely changed without having to reconfiguring spatial relation information on SRS resources for CB/non-CB with respect to a beam indication for the PUSCH or associated CSI-RS by RRC/MAC-CE, so that signaling overhead may be reduced. In addition, there is an advantage that the PUSCH beam may be more dynamically changed without changing the PUCCH beam in DCI format 0_0.

According to an embodiment, in order to prevent collision with the existing UL beam indication method in the aforementioned method, method 4 may be limitedly used in a case in which spatial relation information/associated CSI-RS is not set in SRS resource(s) for CB/non-CB/associated CSI-RS (in the case of DCI format 0_1) and/or in a case in which a mode applying method 4 is explicitly indicated (e.g., configuration/definition of SRI field of DCI 0_1, a specific code point of SRI field of DCI 0_1, addition of a new field indicating ON/OFF of corresponding mode of DCI 0_1).

The CSI-RS/SSB resource (in the case of AP CSI) may be indicated through a CSI request field of DCI, and the method may be applied not only when only CSI is transmitted in PUSCH, but also when UCI different from CSI (e.g., ACK/NACK) and/or data (UL-SCH) are transmitted together.

[Method 4-1]

When the CSI-RS (or SSB) includes a plurality of resources, the PUSCH may be transmitted based on a UL beam/panel corresponding to the CSI-RS (or SSB) selected and reported by the UE.

In addition, when it is configured to report a plurality of CRIs (or SSBRIs), the UE may transmit the corresponding PUSCH based on the UL beam/panel corresponding to the CSI-RS (or SSB) related to the CRI (or SSBRI) having the best quality (e.g., RSRP, SINR, CQI) among the plurality of CRIs (or SSBRIs).

In applying method 4, the aforementioned method 4-1 is a method for solving an ambiguity problem as to based on which CSI-RS the UE should determine the UL panel/beam when there are a plurality of CSI-RSs (or SSBs) to be measured.

When it is configured to perform CSI reporting based on a plurality of CSI-RS (or SSB) resources, the UE selects N (best N) resources with good quality among the corresponding resources and selectively reports CSI for the N resources (N may be set by the BS).

In the case of N=1, the UE selects the CSI-RS (or SSB) resource with the best quality, so that the UL beam/panel for PUSCH transmission may also be determined based on the resource. Considering channel reciprocity properties of DL and UL, the PUSCH has a high probability of being transmitted through a UL panel/beam having high quality.

In addition, in the case of N>1, the UL panel/beam may be determined based on the CSI-RS (or SSB) having the best quality among the N CSI-RS (or SSB) resources. That is, the UE may determine a UL panel/beam based on a DL RS having the best quality among a plurality of DL RS (CSI-RS or SSB) resources or a DL RS determined based on a specific (separate) criterion and transmit CSI report information.

As described above, according to the present embodiment, the CSI PUSCH may be transmitted based on an excellent panel/beam with high probability without additional signaling.

[Method 4-2]

When a plurality of CSI reports are transmitted in one PUSCH resource (e.g., multi-CSI PUSCH in NR Rel-15), the corresponding PUSCH may be transmitted as follows.

According to an embodiment, the UE determines one CSI-RS (or SSB) from among a plurality of CSI-RSs (or SSBs) according to a specific rule and transmit the corresponding PUSCH based on one UL beam/panel corresponding to the CSI-RS (or SSB).

The CSI-RS (or SSB) based on the specific rule may be any one of 1) to 5) below.

1) CSI-RS/SSB having the lowest ID (lowest CSI-RS/SSB ID among selected per CSI report)
2) CSI-RS/SSB with the highest received quality
3) RS (set) in the lowest CC ID
4) RS (set) in PCell
5) RS (set) in default/initial DL BWP in PCell According to an embodiment, after determining a UL panel/beam for each CSI report based on the aforementioned methods, the UE may determine one UL panel/beam according to a specific rule and transmit a PUSCH based on the corresponding UL panel/beam.

The UL panel/beam based on the specific rule may be related to any one of 1) to 4) below.
1) lowest PUSCH ID
2) lowest CSI report ID
3) CSI measured from the most recent DL RS
4) CSI on/for the lowest CC ID or PCell or the default/initial BWP in PCell In applying Method 4 and/or Method 4-1, Method 4-2 is a method for resolving ambiguity in UL panel/beam selection when transmitting a plurality of CSI report information in one PUSCH resource.

A plurality of CSI information may be multiplexed together and transmitted in one PUSCH. This occurs when a plurality of CSI report IDs are bundled and set in one CSI triggering state, and then the corresponding state is triggered by a CSI request field of DCI. In the case of CSI reporting through Multi-CSI PUSCH, since the measurement RS (set) may be different for each CSI, when proposed method 4 and/or 4-1 are applied, a problem in that the UL panel/beam selected for each CSI are different may arise.

In this case, i) a method of selecting a DL RS (set) according to a specific rule and then selecting a UL panel/beam corresponding to the DL RS (set) and ii) a method of selecting a UL panel/beam for each CSI reporting according to method 3 and/or 3-1 and then selecting a UL panel/beam among them according to a specific rule (when the corresponding UL panel/beam does not match) may be considered.

In ii), the specific rule may be based on a predefined CSI priority rule (CSI) for a case in which a size of a payload that may be sent in PUSCH/PUSCH is smaller than a total CSI payload when sending a plurality of CSIs (e.g., a beam report takes precedence over a CSI report). That is, the UL panel/beam may be determined based on the CSI report having the highest priority according to the CSI priority rule.

According to an embodiment, a rule to be applied by the BS, DL RS (set), CSI report, or BWP/CC ID may be designated/configured, instead of the specific rule. For example, in the case of multi-CSI PUSCH, the BS may designate BWP/CC ID(s) to select/apply a UL panel/beam based on a specific DL BWP/CC (set) or UL BWP/CC (set).

In methods 3 and 4, in the case of periodic or semi-persistent (SP) CSI-RS (and in the case of SSB), a transmission beam and/or the corresponding reception panel/beam may be changed at each transmission time point, and thus, it may be more desirable to determine the UL panel/beam based on the most recently transmitted (received) measurement value. For example, when method 4 is applied to semi-static CSI (SP CSI on semi-persistently scheduled (SPS) PUSCH) in a semi-statically scheduled PUSCH, the UL panel/beam may vary for each PUSCH transmission time point.

In the case of the SPS PUSCH, it may be stipulated that the UL panel/beam at the time of initial transmission is maintained until the time of deactivation (since a main purpose is to use it for periodic reporting during a relatively short time period). In the case of periodic or SP CSI on PUCCH, it may be more desirable to change the UL panel/beam on an occasional basis by determining the UL panel/beam based on the most recently transmitted (received) measurement value (since the main purpose is to use it for periodic reporting for a relatively long time period). The proposed methods for the SPS PUSCH may be applied not only to the SP CSI report using the SPS PUSCH but also to transmission of the SPS PUSCH-based UL-SCH (and UCI) (designed for the purpose of URLLC, VoIP, etc.).

In methods 3-1 and 4-1, the BS may not know for sure whether the UE determines the UL panel/beam based on which DL RS (according to a specific method) and transmits the PUSCH/PUCCH. In this case, the BS may need to receive the PUSCH/PUCCH of the corresponding UE through a plurality of DL Rx panel(s)/beam(s). In order to improve the multi-panel/beam-based reception performance, the corresponding PUSCH/PUCCH may be configured to be repeatedly transmitted (in the time or frequency domain) (using the same or different panels/beams).

The methods proposed in this disclosure may be applied only to determining the UL panel (except for the UL beam). In this case, the existing method may be used as a method for indicating one of a plurality of UL beams within the UL panel determined by the above method. In addition, the association process between the DL RS and the UE Rx/Tx panel may be performed before the above proposed methods are applied.

In applying the above proposed methods, the UE and the BS may perform the following procedure.

<PUCCH Transmission>

Step 1: Configuration of PUCCH Resources (and SRS) for this Mode

Procedure for the BS to configure (via RRC message) PUCCH resources to which the proposed method is applied to the UE (e.g., when there is no configuration of spatial relation information, spatial relation information is set to 'flexible' or 'null', explicit setting).

Step 2: DL/UL Beam/Panel Management

The process of matching the DL/UL beam/panel pairs between the BS and the UE

Note: Through this procedure (enhancement), the BS may acquire UL panel/beam information (suitable for each PUCCH/PUSCH transmission)

Step 3: Determination/Selection of UL Panel/Beam for PUCCH

Case1) The UE receiving DL DCI through the PDCCH determines a UL panel/beam for transmission of the ACK/NACK PUCCH based on the TCI of the PDSCH scheduled for the DL DCI (for details, see Methods 1/1-1)

Case2) The UE instructed to perform perodic/SP CSI reporting through PUCCH by RRC/MAC-CE determines the UL panel/beam based on the DL RS that is a measurement target of the PUCCH resource (for details, see Methods 3/3-1/3-2)

<PUSCH Transmission>

Step 1: Configuration of PUSCH and/or SRS for PUSCH

Procedure for the BS to configure whether to apply the proposed method to the UE (in a specific DCI format, in ACK/NACK or CSI transmission, in CB or non-CB based UL transmission) (e.g., no configuration of spatial relation info/associatedCSI-RS for SRS resources for CB/non-CB based UL, explicit indication)

The procedure may be indicated by DCI, and in this case, the procedure may be performed after step 2.

(Example: configuration/definition of SRI field of DCI 0_1, specific code point of SRI field of DCI 0_1, addition of a new field indicating ON/OFF of the corresponding mode of DCI 0_1)

Step 2: DL/UL Beam/Panel Management

A process of matching the DL/UL beam/panel pairs between the BS and the UE

Note: Through this procedure (enhancement), the BS may acquire UL panel/beam information (suitable for each PUCCH/PUSCH transmission).

Step 3: Determination/Selection of UL Panel/Beam for PUSCH

Case1) A UE that receives a DL DCI through a PDCCH and transmits, in a PUSCH, ACK/NACK for a PDSCH scheduled by the corresponding DL DCI (by a specific situation) determines a UL panel/beam based on the TCI of the corresponding PDSCH (See Method 2 for details).

Case2) The UE instructed to perform SP/aperiodic CSI reporting by RRC/MAC-CE/DCI through (SPS) PUSCH determines the UL panel/beam based on the DL RS that is a CSI measurement target (for details, see Methods 4/4-1/4-2).

In terms of implementation, operations (e.g., operations related to uplink beam/panel change based on at least one of Methods 1 to 4) of the BS/UE according to the aforementioned embodiments may be processed by the devices of FIGS. 19 to 23 to be described later. (e.g., the processors 102 and 202 of FIG. 13).

In addition, operations (e.g., operations related to uplink beam/panel change based on at least one of methods 1 to 4) of the BS/UE according to the aforementioned embodiment may be) may be stored in the form of an instruction/program (e.g., instruction, executable code) for driving at least one processor (102 or 202 of FIG. 13).

The aforementioned embodiments will be described in detail below with reference to FIG. 10 in terms of operation of the UE.

FIG. 10 is a flowchart illustrating a method for transmitting a physical uplink shared channel by a UE in a wireless communication system according to an embodiment of the present disclosure.

Referring to FIG. 10, a method for transmitting a PUSCH by a UE in a wireless communication system according to an embodiment of the present disclosure includes a downlink control information receiving step (S1010) and a physical uplink shred channel transmission step (S1020).

In S1010, the UE receives downlink control information (DCI) for scheduling a PUSCH from the BS.

According to an embodiment, a format of the DCI may be DCI format 0_0. The DCI may not include spatial relation RS information on transmission of the PUSCH. Specifically, the DCI may not include a sounding reference signal (SRS) resource indicator (SRI) field. The PUSCH scheduled by DCI format 0_0 may be transmitted based on the spatial relation QCL RS information of the PUCCH resource having the lowest ID.

The operation in which the UE (100/200 in FIGS. 12 to 16) receives DCI for scheduling the PUSCH from the BS (100/200 in FIGS. 12 to 16) according to S1010 described above may be implemented by the device of FIGS. 12 to 16. For example, referring to FIG. 13, one or more processors 102 may control one or more transceivers 106 and/or one or more memories 104 to receive DCI for scheduling a PUSCH from the BS 200.

In S1020, the UE transmits the PUSCH to the BS based on the DCI.

According to an embodiment, based on that spatial relation RS information on transmission of the PUSCH is not configured, the PUSCH may be transmitted based on spatial relation quasi-colocation (QCL) RS information of a CORESET.

According to an embodiment, the predefined CORESET may be a CORESET having the lowest ID in the latest slot in the active bandwidth part (active BWP).

According to an embodiment, the method may further include receiving configuration information related to transmission of the PUSCH. Specifically, the UE may receive configuration information related to transmission of the PUSCH from the BS.

The configuration information may include information indicating application of spatial relation QCL RS information of the predefined CORESET (e.g., information indicating on/off, information indicating enable/disable).

According to an embodiment, the configuration of spatial RS information on transmission of the PUSCH may be determined by the configuration for the PUCCH resource of the bandwidth part (BWP) or the component carrier (CC) related to the PUSCH.

According to an embodiment, based on that the PUSCH includes hybrid automatic repeat request acknowledgment information (HARQ-ACK) for a PDSCH, the PUSCH may be transmitted based on predetermined spatial relation QCL RS information.

According to an embodiment, based on that the PUSCH includes HARQ-ACK information on a plurality of physical downlink shared channels (PDSCHs), the PUSCH may be transmitted based on predetermined spatial relation QCL RS information.

The predetermined spatial relation QCL RS information may include any one of i), ii), and iii):

i) TCI state of any one of a plurality of TCI states for the plurality of PDSCHs, ii) TCI state having a specific index among the plurality of TCI states for the plurality of PDSCHs, and iii) TCI state of a CORESET related to scheduling of the plurality of PDSCHs.

Specifically, i) may be a case in which, when a plurality of TCI states are the same, the type D QCL reference RS included in each TCI state is the same, or QCL relationship is established between the type D QCL reference RSs included in each TCI state. ii) may be a TCI state having the highest or lowest ID among the plurality of TCI states.

According to S1020 described above, an operation in which the UE (100/200 in FIGS. 12 to 16) transmits the PUSCH to the BS (100/200 in FIGS. 12 to 16) based on the DCI may be implemented by the device of FIGS. 12 to 16. For example, referring to FIG. 13, the one or more processors 102 may control one or more transceivers 106 and/or one or more memories 104 to transmit the PUSCH to the BS based on the DCI.

The aforementioned embodiments will be described in detail below with reference to FIG. 11 in terms of the operation of the BS.

FIG. 11 is a flowchart illustrating a method for receiving a physical uplink shared channel (PUSCH) by a BS in a wireless communication system according to another embodiment of the present disclosure.

Referring to FIG. 11, a method for receiving a PUSCH by a BS in a wireless communication system according to another embodiment of the present disclosure transmitting downlink control information (S1110) and receiving a PUSCH (S1120).

In S1110, the BS transmits DCI for scheduling a PUSCH to the UE.

According to an embodiment, the format of the DCI may be a DCI format 0_0. The DCI may not include spatial relation RS information on transmission of the PUSCH. Specifically, the DCI may not include a sounding reference signal (SRS) resource indicator (SRI) field. The PUSCH scheduled by DCI format 0_0 may be transmitted based on the spatial relation QCL RS information of the PUCCH resource having the lowest ID.

According to S1110, an operation in which the BS (100/200 in FIGS. 12 to 16) transmits the DCI for scheduling the PUSCH from the UE (100/200 in FIGS. 12 to 16) may be implemented by the device of FIGS. 12 to 16. For example, referring to FIG. 13, one or more processors 202 may control one or more transceivers 206 and/or one or more memories 204 to transmit DCI for scheduling a PUSCH to the UE 100.

In S1120, the BS receives the PUSCH based on the DCI from the UE.

According to an embodiment, based on that spatial relation RS information for transmission of the PUSCH is not configured, the PUSCH may be transmitted based on spatial relation quasi-colocation (QCL) RS information of a CORESET.

According to an embodiment, the predefined CORESET may be a CORESET having the lowest ID in the latest slot in the active bandwidth part (active BWP).

According to an embodiment, the method may further include transmitting configuration information related to transmission of the PUSCH. Specifically, the BS may transmit configuration information related to the transmission of the PUSCH to the UE.

The configuration information may include information indicating application of spatial relation QCL RS information of the predefined CORESET (e.g., information indicating on/off, information indicating enable/disable).

According to an embodiment, the configuration of spatial RS information on transmission of the PUSCH may be determined by the configuration for the PUCCH resource of the BWP or a component carrier (CC) related to the PUSCH.

According to an embodiment, based on that the PUSCH includes HARQ-ACK for a PDSCH, the PUSCH may be transmitted based on QCL RS information of the PDSCH.

According to an embodiment, based on that the PUSCH includes HARQ-ACK information on a plurality of physical downlink shared channels (PDSCHs), the PUSCH may be transmitted based on predetermined spatial relation QCL RS information.

The predetermined spatial relation QCL RS information may include any one of i), ii), and iii):

i) TCI state of any one of a plurality of TCI states for the plurality of PDCCHs, ii) TCI state having a specific index among the plurality of TCI states for the plurality of PDCCHs, iii) TCI state of a CORESET related to scheduling of the plurality of PDCCHs.

Specifically, i) may be a case in which, when a plurality of TCI states are the same, the type D QCL reference RS included in each TCI state is the same, or QCL relationship is established between the type D QCL reference RSs included in each TCI state. ii) may be a TCI state having the highest or lowest ID among the plurality of TCI states.

According to S1120 described above, an operation in which the BS (100/200 in FIGS. 12 to 16) receives the PUSCH based on the DCI from the UE (100/200 in FIGS. 12 to 16) may be implemented by the device of FIGS. 12 to 16. For example, referring to FIG. 13, the one or more processors 202 may control one or more transceivers 206 and/or one or more memories 204 to receive the PUSCH based on the DCI from the UE 100.

Example of Communication System Applied to Present Disclosure

The various descriptions, functions, procedures, proposals, methods, and/or operational flowcharts of the present disclosure described in this document may be applied to, without being limited to, a variety of fields requiring wireless communication/connection (e.g., 5G) between devices.

Hereinafter, a description will be given in more detail with reference to the drawings. In the following drawings/description, the same reference symbols may denote the same or corresponding hardware blocks, software blocks, or functional blocks unless described otherwise.

FIG. 12 illustrates a communication system 1 applied to the present disclosure.

Referring to FIG. 12, a communication system 1 applied to the present disclosure includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 100a, vehicles 100b-1 and 100b-2, an eXtended Reality (XR) device 100c, a hand-held device 100d, a home appliance 100e, an Internet of Things (IoT) device 100f, and an Artificial Intelligence (AI) device/server 400. For example, the vehicles may include a vehicle having a wireless communication function, an autonomous driving vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200a may operate as a BS/network node with respect to other wireless devices.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without passing through the BSs/network. For example, the vehicles 100b-1 and 100b-2 may perform direct communication (e.g. Vehicle-to-Vehicle (V2V)/Vehicle-to-everything (V2X) communication). The IoT device (e.g., a sensor) may perform direct communication with other IoT devices (e.g., sensors) or other wireless devices 100a to 100f.

Wireless communication/connections 150a, 150b, or 150c may be established between the wireless devices 100a to 100f/BS 200, or BS 200/BS 200. Herein, the wireless communication/connections may be established through various RATs (e.g., 5G NR) such as uplink/downlink communication 150a, sidelink communication 150b (or, D2D communication), or inter BS communication (e.g. relay, Integrated Access Backhaul (IAB)). The wireless devices and the BSs/the wireless devices may transmit/receive radio signals to/from each other through the wireless communication/connections 150a and 150b. For example, the wireless communication/connections 150a and 150b may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Example of Wireless Device Applied to the Present Disclosure.

FIG. 13 illustrates wireless devices applicable to the present disclosure.

Referring to FIG. 13, a first wireless device 100 and a second wireless device 200 may transmit radio signals through a variety of RATs (e.g., LTE and NR). Herein, {the first wireless device 100 and the second wireless device 200} may correspond to {the wireless device 100x and the BS 200} and/or {the wireless device 100x and the wireless device 100x} of FIG. 12.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the present disclosure, the wireless device may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the wireless device may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. From RF band signals into baseband signals in order to process received user data, control information, radio signals/channels, etc. using the one or more processors 102 and 202. The one or more transceivers 106 and 206 may convert the user data, control information, radio signals/channels, etc. Processed using the one or more processors 102 and 202 from the base band signals into the RF band signals. To this end, the one or more transceivers 106 and 206 may include (analog) oscillators and/or filters.

Example of Signal Processing Circuit Applied to the Present Disclosure

FIG. 14 illustrates a signal process circuit for a transmission signal.

Referring to FIG. 14, a signal processing circuit 1000 may include scramblers 1010, modulators 1020, a layer mapper 1030, a precoder 1040, resource mappers 1050, and signal generators 1060. An operation/function of FIG. 14 may be performed, without being limited to, the processors 102 and 202 and/or the transceivers 106 and 206 of FIG. 13. Hardware elements of FIG. 14 may be implemented by the processors 102 and 202 and/or the transceivers 106 and 206 of FIG. 13. For example, blocks 1010 to 1060 may be implemented by the processors 102 and 202 of FIG. 13. Alternatively, the blocks 1010 to 1050 may be implemented by the processors 102 and 202 of FIG. 13 and the block 1060 may be implemented by the transceivers 106 and 206 of FIG. 13.

Codewords may be converted into radio signals via the signal processing circuit 1000 of FIG. 14. Herein, the codewords are encoded bit sequences of information blocks. The information blocks may include transport blocks (e.g., a UL-SCH transport block, a DL-SCH transport block). The radio signals may be transmitted through various physical channels (e.g., a PUSCH and a PDSCH).

Specifically, the codewords may be converted into scrambled bit sequences by the scramblers 1010. Scramble sequences used for scrambling may be generated based on an initialization value, and the initialization value may include ID information of a wireless device. The scrambled bit sequences may be modulated to modulation symbol sequences by the modulators 1020. A modulation scheme may include pi/2-Binary Phase Shift Keying (pi/2-BPSK), m-Phase Shift Keying (m-PSK), and m-Quadrature Amplitude Modulation (m-QAM). Complex modulation symbol sequences may be mapped to one or more transport layers by the layer mapper 1030. Modulation symbols of each transport layer may be mapped (precoded) to corresponding antenna port(s) by the precoder 1040. Outputs z of the precoder 1040 may be obtained by multiplying outputs y of the layer mapper 1030 by an N*M precoding matrix W. Herein, N is the number of antenna ports and M is the number of transport layers. The precoder 1040 may perform precoding after performing transform precoding (e.g., DFT) for complex modulation symbols. Alternatively, the precoder 1040 may perform precoding without performing transform precoding.

The resource mappers 1050 may map modulation symbols of each antenna port to time-frequency resources. The time-frequency resources may include a plurality of symbols (e.g., a CP-OFDMA symbols and DFT-s-OFDMA symbols) in the time domain and a plurality of subcarriers in the frequency domain. The signal generators 1060 may generate radio signals from the mapped modulation symbols and the generated radio signals may be transmitted to other devices through each antenna. For this purpose, the signal generators 1060 may include Inverse Fast Fourier Transform (IFFT) modules, Cyclic Prefix (CP) inserters, Digital-to-Analog Converters (DACs), and frequency up-converters.

Signal processing procedures for a signal received in the wireless device may be configured in a reverse manner of the signal processing procedures 1010 to 1060 of FIG. 14. For example, the wireless devices (e.g., 100 and 200 of FIG. 13) may receive radio signals from the exterior through the antenna ports/transceivers. The received radio signals may be converted into baseband signals through signal restorers. To this end, the signal restorers may include frequency downlink converters, Analog-to-Digital Converters (ADCs), CP remover, and Fast Fourier Transform (FFT) modules. Next, the baseband signals may be restored to codewords through a resource demapping procedure, a postcoding procedure, a demodulation processor, and a descrambling procedure. The codewords may be restored to original information blocks through decoding. Therefore, a signal processing circuit (not illustrated) for a reception signal may include signal restorers, resource demappers, a postcoder, demodulators, descramblers, and decoders.

Example of Application of Wireless Device Applied to the Present Disclosure

FIG. 15 illustrates another example of a wireless device applied to the present disclosure.

The wireless device may be implemented in various forms according to a use-case/service (refer to FIG. 12). Referring to FIG. 15, wireless devices 100 and 200 may correspond to the wireless devices 100 and 200 of FIG. 13 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 13. For example, the transceiver(s) 114 may include the one or more transceivers 106 and 206 and/or the one or more antennas 108 and 208 of FIG. 13. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100a of FIG. 12), the vehicles (100b-1 and 100b-2 of FIG. 12), the XR device (100c of FIG. 12), the hand-held device (100d of FIG. 12), the home appliance (100e of FIG. 12), the IoT device (100f of FIG. 12), a digital broadcast terminal, a hologram device, a public safety device, an MTC device, a medicine device, a fintech device (or a finance device), a security device, a climate/environment device, the AI server/device (400 of FIG. 12), the BSs (200 of FIG. 12), a network node, etc. The wireless device may be used in a mobile or fixed place according to a use-example/service.

In FIG. 15, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an Electronic Control Unit (ECU), a graphical processing unit, and a memory control processor. As another example, the memory 130 may be configured by a Random Access Memory (RAM), a Dynamic RAM (DRAM), a Read Only Memory (ROM)), a flash memory, a volatile memory, a non-volatile memory, and/or a combination thereof.

Example of Hand-Held Device Applied to the Present Disclosure

FIG. 16 illustrates a hand-held device applied to the present disclosure.

The hand-held device may include a smartphone, a smartpad, a wearable device (e.g., a smartwatch or a smartglasses), or a portable computer (e.g., a notebook). The hand-held device may be referred to as a mobile station (MS), a user terminal (UT), a Mobile Subscriber Station (MSS), a Subscriber Station (SS), an Advanced Mobile Station (AMS), or a Wireless Terminal (WT).

Referring to FIG. 16, a hand-held device 100 may include an antenna unit 108, a communication unit 110, a control unit 120, a memory unit 130, a power supply unit 140a, an interface unit 140b, and an I/O unit 140c. The antenna unit 108 may be configured as a part of the communication unit 110. Blocks 110 to 130/140a to 140c correspond to the blocks 110 to 130/140 of FIG. 15, respectively.

The communication unit 110 may transmit and receive signals (e.g., data and control signals) to and from other wireless devices or BSs. The control unit 120 may perform various operations by controlling constituent elements of the hand-held device 100. The control unit 120 may include an Application Processor (AP). The memory unit 130 may store data/parameters/programs/code/commands needed to drive the hand-held device 100. The memory unit 130 may store input/output data/information. The power supply unit 140a may supply power to the hand-held device 100 and include a wired/wireless charging circuit, a battery, etc. The interface unit 140b may support connection of the hand-held device 100 to other external devices. The interface unit 140b may include various ports (e.g., an audio I/O port and a video I/O port) for connection with external devices. The I/O unit 140c may input or output video information/signals, audio information/signals, data, and/or information input by a user. The I/O unit 140c may include a camera, a microphone, a user input unit, a display unit 140d, a speaker, and/or a haptic module.

As an example, in the case of data communication, the I/O unit 140c may acquire information/signals (e.g., touch, text, voice, images, or video) input by a user and the acquired information/signals may be stored in the memory unit 130. The communication unit 110 may convert the information/signals stored in the memory into radio signals and transmit the converted radio signals to other wireless devices directly or to a BS. The communication unit 110 may receive radio signals from other wireless devices or the BS and then restore the received radio signals into original information/signals. The restored information/signals may be stored in the memory unit 130 and may be output as various types (e.g., text, voice, images, video, or haptic) through the I/O unit 140c.

Effects of the method and device for transmitting and receiving a PUSCH in a wireless communication system according to an embodiment of the present disclosure will be described as follows.

According to an embodiment of the present disclosure, a PUSCH is scheduled by DCI. A format of the DCI is DCI format 0_0, and based on that spatial relation RS information for transmission of the PUSCH is not configured, the PUSCH is transmitted based on spatial relation QCL (quasi-colocation) RS information of predefined CORESET.

Therefore, if there is no beam configuration for transmission of the PUSCH scheduled based on DCI format 0_0, 1) ambiguity of PUSCH transmission/reception operation may be eliminated and 2) the signaling procedure for updating spatial relation information of PUCCH resources having the lowest PUCCH ID may be omitted, and thus, signaling overhead is reduced.

According to an embodiment of the present disclosure, based on that the PUSCH includes HARQ-ACK information for the PDSCH, the PUSCH is transmitted based on QCL RS information of the PDSCH. Accordingly, the uplink transmission beam/panel may be changed according to a change of the downlink reception beam, a procedure or signaling for a separate uplink beam/panel change due to movement of the UE may be omitted.

According to an embodiment of the present disclosure, based on that the PUSCH includes HARQ-ACK information on a plurality of PDSCH, the PUSCH is transmitted based on predetermined spatial relation QCL RS information. The predetermined spatial relation QCL RS information may include any one of i), ii), and iii): i) TCI state of any one of a plurality of TCI states for the plurality of PDSCHs, ii) a TCI state having a specific index among the plurality of TCI states for the plurality of PDSCHs, iii) TCI status of a control resource set (CORESET) related to scheduling of the plurality of PDSCHs. Accordingly, a problem of ambiguity in operation of the UE/BS that occurs as ACK/NACK for a plurality of PDSCHs is transmitted in one PUSCH resource may be prevented.

As described above, according to the embodiments of the present disclosure, in any of cases i) to iii): i) when there is no beam configuration for PUSCH transmission scheduled according to DCI format 0_0 ii) when the PUSCH includes ACK/NACK of the PDSCH, and iii) when the PUSCH includes ACK/NACK of a plurality of PDSCHs, ambiguity of the operation of the UE/BS does not occur and the PUSCH may be transmitted without an additional signaling procedure. Accordingly, flexibility related to beam configuration increases in PUSCH transmission.

The embodiments described above are implemented by combinations of components and features of the present disclosure in predetermined forms. Each component or feature should be considered selectively unless specified separately. Each component or feature may be carried out without being combined with another component or feature. Moreover, some components and/or features are combined with each other and may implement embodiments of the present disclosure. The order of operations described in embodiments of the present disclosure may be changed. Some components or features of one embodiment may be included in another embodiment, or may be replaced by corresponding components or features of another embodiment. It is apparent that some claims referring to specific claims may be combined with another claims referring to the claims other than the specific claims to constitute the embodiment or add new claims by means of amendment after the application is filed.

Embodiments of the present disclosure may be implemented by various means, for example, hardware, firmware, software, or combinations thereof. When embodiments are implemented by hardware, one embodiment of the present disclosure may be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, and the like.

When embodiments are implemented by firmware or software, one embodiment of the present disclosure may be implemented by modules, procedures, functions, etc. Performing functions or operations described above. Software code may be stored in a memory and may be driven by a processor. The memory is provided inside or outside the processor and may exchange data with the processor by various well-known means.

It is apparent to those skilled in the art that the present disclosure may be embodied in other specific forms without departing from essential features of the present disclosure. Accordingly, the aforementioned detailed description should not be construed as limiting in all aspects and should be considered as illustrative. The scope of the present disclosure should be determined by rational construing of the appended claims, and all modifications within an equivalent scope of the present disclosure are included in the scope of the present disclosure.

What is claimed is:

1. A method of transmitting a physical uplink shared channel (PUSCH) by a user equipment (UE) in a wireless communication system, the method comprising:
   receiving downlink control information (DCI) for scheduling a PUSCH; and
   transmitting the PUSCH based on the DCI,
   wherein a format of the DCI is DCI format 0_0,
   wherein spatial relation reference signal (RS) information for transmission of the PUSCH is determined based on configuration for a physical uplink control channel (PUCCH) resource of a BWP related to the PUSCH, and
   wherein, based on that the spatial relation RS information for transmission of the PUSCH is not configured:
      the PUSCH is transmitted based on spatial relation quasi-colocation (QCL) RS information of a predefined control resource set (CORESET), and
      the predefined CORESET is a CORESET having a lowest ID within an active bandwidth part (BWP).

2. The method of claim 1, further comprising:
   receiving configuration information related to transmission of the PUSCH,
   wherein the configuration information includes information indicating application of the QCL RS information of the predefined CORSEET.

3. The method of claim 1, wherein the DCI does not include the spatial relation RS information for transmission of the PUSCH.

4. The method of claim 3, wherein the DCI does not include a Sounding reference signal Resource Indicator (SRI) field.

5. The method of claim 1, wherein, based on that the PUSCH includes hybrid automatic repeat request (HARD)-acknowledgement (ACK) information on a physical downlink shared channel (PDSCH),
   the PUSCH is transmitted based on QCL RS information of the PDSCH.

6. The method of claim 1, wherein, based on that the PUSCH includes HARQ-ACK information on a plurality of PDSCHs,
   the PUSCH is transmitted based on predetermined spatial relation QCL RS information.

7. The method of claim 6, wherein the predetermined spatial relation QCL RS information includes any one of
   i) any one of a plurality of transmission configuration indication (TCI) states for the plurality of PDSCHs,
   ii) a TCI state having a specific index among the plurality of TCI states for the plurality of PDSCHs, and iii) a TCI state of a CORESET related to scheduling of the plurality of PDSCHs.

8. The method of claim 1, wherein the CORESET having the lowest ID is determined based on a latest slot within the active BWP.

9. A user equipment (UE) for transmitting a physical uplink shared channel (PUSCH) in a wireless communication system, the UE comprising:
one or more transceivers;
one or more processors; and
one or more memories operatively connected to the one or more processors and storing instructions, when executed by the one or more processors, that configure the one or more processors to perform operations,
wherein the operations include:
receiving downlink control information (DCI) for scheduling a PUSCH; and
transmitting the PUSCH based on the DCI,
wherein a format of the DCI is DCI format 0_0,
wherein spatial relation reference signal (RS) information for transmission of the PUSCH is determined based on configuration for a physical uplink control channel (PUCCH) resource of a BWP related to the PUSCH, and
wherein, based on that the spatial relation RS information for transmission of the PUSCH is not configured:
the PUSCH is transmitted based on spatial relation quasi-colocation (QCL) RS information of a predefined control resource set (CORESET), and
the predefined CORESET is a CORESET having a lowest ID within an active bandwidth part (BWP).

10. The UE of claim 9, further comprising:
receiving configuration information related to transmission of the PUSCH,
wherein the configuration information includes information indicating application of the QCL RS information of the predefined CORESET.

11. The UE of claim 9, wherein the DCI does not include the spatial relation RS information for transmission of the PUSCH.

12. The UE of claim 11, wherein the DCI does not include a Sounding reference signal Resource Indicator (SRI) field.

13. The UE of claim 9, wherein,
based on that the PUSCH includes hybrid automatic repeat request (HARQ)-acknowledgement (ACK) information on a physical downlink shared channel (PDSCH),
the PUSCH is transmitted based on QCL RS information of the PDSCH.

14. The UE of claim 9, wherein, based on that the PUSCH includes HARQ-ACK information on a plurality of PDSCHs,
the PUSCH is transmitted based on predetermined spatial relation QCL RS information.

15. The UE of claim 14, wherein the predetermined spatial relation QCL RS information includes any one of
i) any one of a plurality of transmission configuration indication (TCI) states for the plurality of PDSCHs,
ii) a TCI state having a specific index among the plurality of TCI states for the plurality of PDSCHs, and
iii) a TCI state of a CORESET related to scheduling of the plurality of PDSCHs.

16. A device comprising:
one or more processors; and
one or more memories functionally connected to the one or more processors and storing instructions that, when executed by the one or more processors, configure the one or more processors to perform operations,
wherein the operations comprise:
receiving downlink control information (DCI) for scheduling a PUSCH, and
transmitting the PUSCH based on the DCI,
wherein a format of the DCI is DCI format 0_0,
wherein spatial relation reference signal (RS) information for transmission of the PUSCH is determined based on configuration for a physical uplink control channel (PUCCH) resource of a BWP related to the PUSCH, and
wherein, based on that spatial relation reference signal (RS) information for transmission of the PUSCH is not configured:
the PUSCH is transmitted based on spatial relation quasi-colocation (QCL) RS information of a predefined control resource set (CORESET), and
the predefined CORESET is a CORESET having a lowest ID within an active bandwidth part (BWP).

17. A non-transitory computer-readable medium, which is one or more for storing one or more instructions,
wherein one or more instructions, when executed by one or more processors, configure the one or more processors to perform operations,
wherein the operations comprise:
receiving downlink control information (DCI) for scheduling a PUSCH,
and transmitting the PUSCH based on the DCI,
wherein a format of the DCI is DCI format 0_0,
wherein spatial relation reference signal (RS) information for transmission of the PUSCH is determined based on configuration for a physical uplink control channel (PUCCH) resource of a BWP related to the PUSCH, and
wherein, based on that the spatial relation RS information for transmission of the PUSCH is not configured:
the PUSCH is transmitted based on spatial relation quasi-colocation (QCL) RS information of a predefined control resource set (CORESET), and
the predefined CORESET is a CORESET having a lowest ID within an active bandwidth part (BWP).

\* \* \* \* \*